United States Patent [19]

Kawatsu

[11] Patent Number: 5,677,073
[45] Date of Patent: Oct. 14, 1997

[54] FUEL CELL GENERATOR AND METHOD OF THE SAME

[75] Inventor: Shigeyuki Kawatsu, Shizuoka, Japan

[73] Assignee: Toyota Jidosha Kabushiki Kaisha, Toyota, Japan

[21] Appl. No.: 499,952

[22] Filed: Jul. 10, 1995

[30] Foreign Application Priority Data

Jul. 13, 1994 [JP] Japan .................................. 6-185358

[51] Int. Cl.⁶ .................. H01M 8/04; C25B 9/00; G01N 27/26
[52] U.S. Cl. .................. 429/22; 429/23; 429/24; 429/25; 204/265; 204/266; 204/409
[58] Field of Search .................. 204/409, 265, 204/266; 429/22, 23, 24, 25

[56] References Cited

U.S. PATENT DOCUMENTS 3,539,397  11/1970  Keating, Jr. et al. .................. 429/24

FOREIGN PATENT DOCUMENTS

| | | |
|---|---|---|
| 60-189176 | 9/1985 | Japan . |
| 60-241664 | 11/1985 | Japan . |
| 63-22425 | 5/1988 | Japan . |
| 63-195969 | 8/1988 | Japan . |
| 63-232272 | 9/1988 | Japan . |
| 2-44654 | 2/1990 | Japan . |
| 04-206161 | 7/1992 | Japan . |

*Primary Examiner*—Kathryn L. Gorgos
*Assistant Examiner*—Edna Wong
*Attorney, Agent, or Firm*—Oblon, Spivak, McClelland, Maier & Neustadt, P.C.

[57] ABSTRACT

The invention definitely detects and cancels poisoning of a electrocatalyst in a fuel cell without delay. A first temperature sensor (61) and a second temperature sensor (63) are disposed respectively at an inlet and an outlet of first channels (34p) for gaseous fuel in a fuel cell (10). An electronic control unit (70) receives detection signals from the temperature sensors (61,63) and estimates a degree of poisoning of electrocatalyst on an anode (32) based on the detection signals. When determining that the electrocatalyst is poisoned, the electronic control unit (70) controls on and off first through fourth solenoid valves (51–54) to change the flow direction of the gaseous fuel through the first channels (34p). This allows a place with electrocatalyst poisoning to be exposed to the gaseous fuel having a relatively low concentration of carbon monoxide.

25 Claims, 17 Drawing Sheets

FUEL CELL GENERATOR AND METHOD OF THE SAME

BACKGROUND OF THE INVENTION

1. Field of the Invention

The present invention relates to a fuel cell generator, and more specifically to a fuel cell generator for protecting an electrocatalyst in a fuel cell from poisoning by carbon monoxide.

2. Description of the Related Art

Fuel cells are known apparatus in which the chemical energy of a fuel is converted directly into electrical energy. The fuel cell generally has a pair of electrodes arranged across an electrolyte, where the surface of one electrode comes into contact with reactive gaseous hydrogen (gaseous fuel) while the surface of the other electrode being in contact with an oxidizing gas containing oxygen. The electrical energy is generated between the electrodes through the electrochemical reactions occurring by the contact.

A gaseous fuel supplied to such a fuel cell is generated by a reformer, where methanol is steam-reformed according to the following reactions:

$$CH_3OH \rightarrow CO + 2H_2 - 21.7 \text{ kcal/mol (endothermic reaction)} \quad (1)$$

$$CO + H_2O \rightarrow CO_2 + H_2 + 9.8 \text{ kcal/mol (exothermic reaction)} \quad (2)$$

$$CH_3OH + H_2O \rightarrow CO_2 + 3H_2 - 11.9 \text{ kcal/mol (endothermic reaction)} \quad (3)$$

Carbon monoxide (CO) generated by the reaction (1) is attracted to platinum or platinum-containing alloy acting as electrocatalyst of the fuel electrode and interferes with the catalytic action of platinum. This is generally referred to as poisoning of electrocatalyst. Such a fuel cell generator accordingly requires a structure which takes into account the presence of carbon monoxide included in the gaseous fuel fed from the reformer.

A proposed fuel cell generator for solving the above problem (JAPANESE PATENT LAYING-OPEN GAZETTE No. S-63-232272) has a sensor disposed at an inlet of a gaseous fuel supply conduit in a fuel cell for detecting the concentration of carbon monoxide. The system raises the temperature of the fuel cell according to the high concentration of carbon monoxide detected by the sensor. The allowable concentration of carbon monoxide for the fuel cell increases with an increase in temperature. When the sensor detects the high concentration of carbon monoxide, the structure raises the temperature of the fuel cell to increase the allowable concentration of carbon monoxide for the fuel cell.

This conventional system, however, can not sufficiently cancel the poisoning since there is a time lag between detection of an increase in concentration of carbon monoxide by the sensor and actual occurrence of carbon poisoning.

The time lag between detection of an increase and actual occurrence of carbon poisoning is ascribed to the following reasons. Hydrogen in a gaseous fuel is consumed through electrochemical reactions at the electrode. The gaseous fuel in gas channels disposed facing to the electrode accordingly has higher concentrations of carbon monoxide (ratio of carbon monoxide to gaseous hydrogen) at places closer to an outlet of the gas channels. The detected concentration of carbon monoxide at the inlet of the gas channels does not represent the increased concentration of carbon monoxide over the surface of the electrode, which actually affects the electrocatalyst poisoning. It is thus difficult to determine whether the electrocatalyst is being poisoned with high accuracy, based on the detection of the sensor. When the sensor detects the high concentration of carbon monoxide, for example, the concentration of carbon monoxide may have already increased at the outlet, which is far from the inlet with the sensor. This may result in severe poisoning of electrocatalyst and prevent an efficient countermeasure from being taken against the electrocatalyst poisoning without delay.

The sensor conventionally applied has poor performance. A sensor for detecting the concentration of carbon monoxide generally follows a constant-potential electrolytic system. This is significantly affected by hydrogen and can not measure the concentration of carbon monoxide with high accuracy when the ratio of carbon monoxide to hydrogen is relatively small like gaseous fuel. Detection of the sensor accordingly has some errors, and it is impossible to accurately determine the occurrence of electrocatalyst poisoning based on the detection of the sensor. Such problems are especially prominent in polymer electrolyte fuel cells, wherein an electrocatalyst is easily poisoned by a low concentration of carbon monoxide. The sensor of low reliability may delay detection of electrocatalyst poisoning and thereby execution of a countermeasure against the electrocatalyst poisoning.

SUMMARY OF THE INVENTION

The object of the invention is thus to definitely detect and cancel poisoning of electrocatalyst in a fuel cell without delay.

The above and the other objects are realized by a fuel cell generator for generating an electromotive force through an electrochemical reaction of a reactive gas. The fuel cell generator comprises:

- a first electrode having a surface with a electrocatalyst applied thereon, the reactive gas being fed to a surface of the first electrode to cause the electrochemical reaction;
- a flow path having an inlet and an outlet for supplying the reactive gas to the surface of the first electrode;
- reactivity difference detecting means for detecting a difference in reactivity of the electrocatalyst between the inlet and the outlet of the reactive gas on the surface of the electrode;
- estimation means for estimating a degree of poisoning of the electrocatalyst based on the difference detected by the reactivity difference detecting means; and
- poisoning cancellation means for canceling the poisoning according to the degree of poisoning of the electrocatalyst determined by the estimation means.

In the fuel cell generator thus constructed, the estimation means estimates a degree of poisoning of electrocatalyst based on the difference in reactivity detected by the reactivity difference detecting means. The difference in reactivity sufficiently corresponds to the degree of poisoning of electrocatalyst. The estimation executed by the estimation means accordingly has high accuracy and precision. The poisoning cancellation means cancels the poisoning according to the degree of electrocatalyst poisoning determined by the estimation means. This structure definitely cancels the poisoning of electrocatalyst in the fuel cell without delay.

According to one preferable structure, the fuel cell generator further comprises gas utilization calculating means for calculating a degree of utilization of the reactive gas on the first electrode. In this structure, it is preferable that the estimation means is provided with prohibition means for prohibiting the estimation of the degree of poisoning when the degree of utilization of the reactive gas represents insufficiency of the reactive gas.

The gas utilization calculating means preferably comprises: required flow calculation means for calculating a required flow of the reactive gas to the electrode; actual supply calculation means for calculating an actual supply of the reactive gas to the electrode; and difference calculation means for calculating a difference between the required flow and the actual supply.

According to another preferable structure, the reactivity difference detecting means in provided with temperature difference detecting means for detecting a difference in temperature between the inlet and the outlet of the flow path.

In an alternative structure, the reactivity difference detecting means has electrical output difference detecting means for detecting a difference in electrical output of the first electrode between the inlet and the outlet of the flow path.

According to still another possible structure, the poisoning cancellation means has gas flow control means for controlling a flow direction of the reactive gas to thereby reduce the poisoning.

In this structure, it is preferable that the poisoning cancellation means further comprises: a second electrode having a surface with a electrocatalyst applied thereon, an oxidizing gas being fed to a surface of the second electrode; oxidizing gas flow control means for controlling a flow direction of the oxidizing gas, to make the flow direction of the oxidizing gas identical with the flow direction of the reactive gas.

In the structure above, it is also preferable that the fuel cell generator further comprises a coolant conduit running substantially parallel to the surface of the electrode for passing a coolant parallel the flow direction of the reactive gas. In this case, the poisoning cancellation means has coolant flow control means for controlling a flow direction of the coolant through the coolant conduit to thereby reduce said poisoning.

It is further preferable that the fuel cell generator has: temperature control means for varying temperature of the coolant fed to the coolant conduit; and flow control means for varying a flow of the coolant fed to the coolant conduit. In this structure, the poisoning cancellation means preferably has cooling heat quantity control means for activating the temperature control means and the flow control means to lower the temperature and the flow of the coolant, so as to maintain a quantity of heat adsorbable by the coolant constant.

According to another preferable application, the fuel cell generator also has reformer means for reforming a fuel to generate the reactive gas, wherein the poisoning cancellation means has reforming suppression means for forcibly lowering a concentration of carbon monoxide included in the reactive gas. It is also preferable that the poisoning cancellation means further comprises: gas flow reversion means for reversing the flow direction of the reactive gas along the surface of the first electrode; and selective activating means for selectively activating one of the gas flow reversion means and the reforming suppression means according to the degree of poisoning of electrocatalyst estimated by the estimation means.

According to still another application, the poisoning cancellation means has supply pressure increasing means for temporarily increasing a supply pressure of the reactive gas to the first electrode. In this case, it is preferable that the poisoning cancellation means further comprises: gas flow reversion means for reversing the flow direction of the reactive gas along the surface of the first electrode; and selective activating means for selectively activating one of the gas flow reversion means and the supply pressure increasing means according to the degree of poisoning of electrocatalyst estimated by the estimation means.

According to another preferable application, the poisoning cancellation means comprises stop means for substituting the reactive gas with a purge gas flowing along the surface of the electrode to stop generation of the electromotive force. The poisoning cancellation means also has: gas flow reversion means for reversing the flow direction of the reactive gas along the surface of the first electrode; and selective activating means for selectively activating one of the gas flow reversion means and the stop means according to the degree of poisoning of electrocatalyst estimated by the estimation means.

The invention is also directed to a fuel cell generating method for generating an electromotive force through an electrochemical reaction of a reactive gas. The method comprises the steps of:

(a) providing a first electrode having a surface with a electrocatalyst applied thereon, the reactive gas being fed to a surface of the first electrode to cause the electrochemical reaction;

(b) providing a flow path having an inlet and an outlet for supplying the reactive gas to the surface of the first electrode;

(c) detecting a difference in reactivity of the electrocatalyst between the inlet and the outlet of the flow path;

(d) estimating a degree of poisoning of the electrocatalyst based on the difference detected in the step (c); and (e) canceling the poisoning according to the degree of poisoning of the electrocatalyst determined in the step (d).

These and other objects, features, aspects, and advantages of the present invention will become more apparent from the following detailed description of the preferred embodiments with the accompanying drawings.

DESCRIPTION OF THE PREFERRED EMBODIMENT

Figure 1:
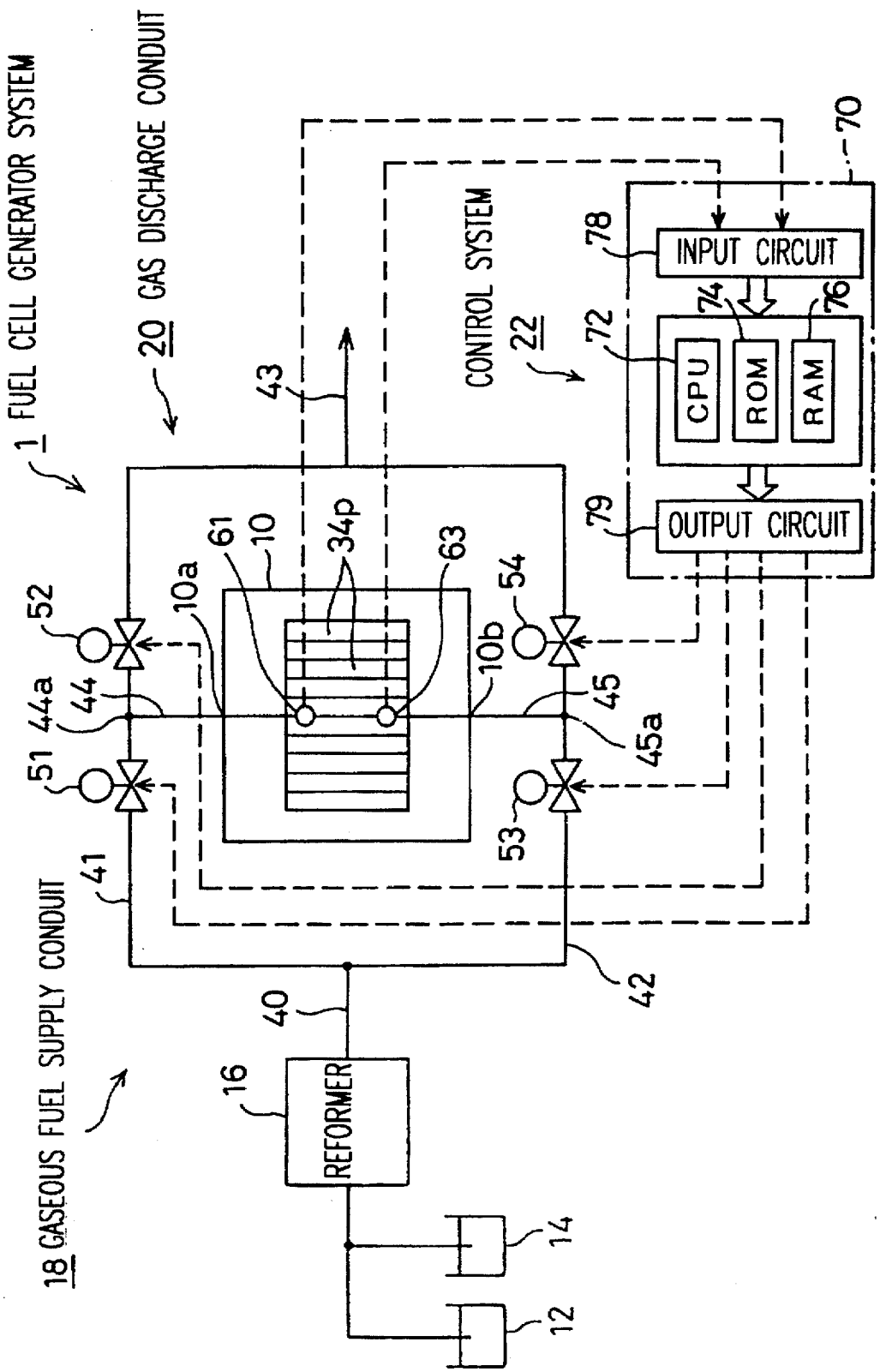
FIG. 1 is a block diagram schematically illustrating a structure of a fuel cell generator system 1 as a first embodiment according to the invention.

FIG. 1 is a block diagram schematically illustrating a structure of a fuel cell generator system 1 as a first embodiment according to the invention. The fuel cell generator system 1 includes a fuel cell 10 composed of a solid polymer electrolyte for generating electrical energy, a reformer 16 for generating hydrogen-rich gas from methanol stored in a methanol reservoir 12 and water stored in a water reservoir 14, a gaseous fuel supply conduit 18 for feeding the hydrogen-rich gas generated by the reformer 16 as a gaseous fuel to the fuel cell 10, and a gas discharge conduit 20 for discharging residual gas from the fuel cell 10. The fuel cell generator system 1 is further provided with an electric control system 22 including a microcomputer.

Figure 2:
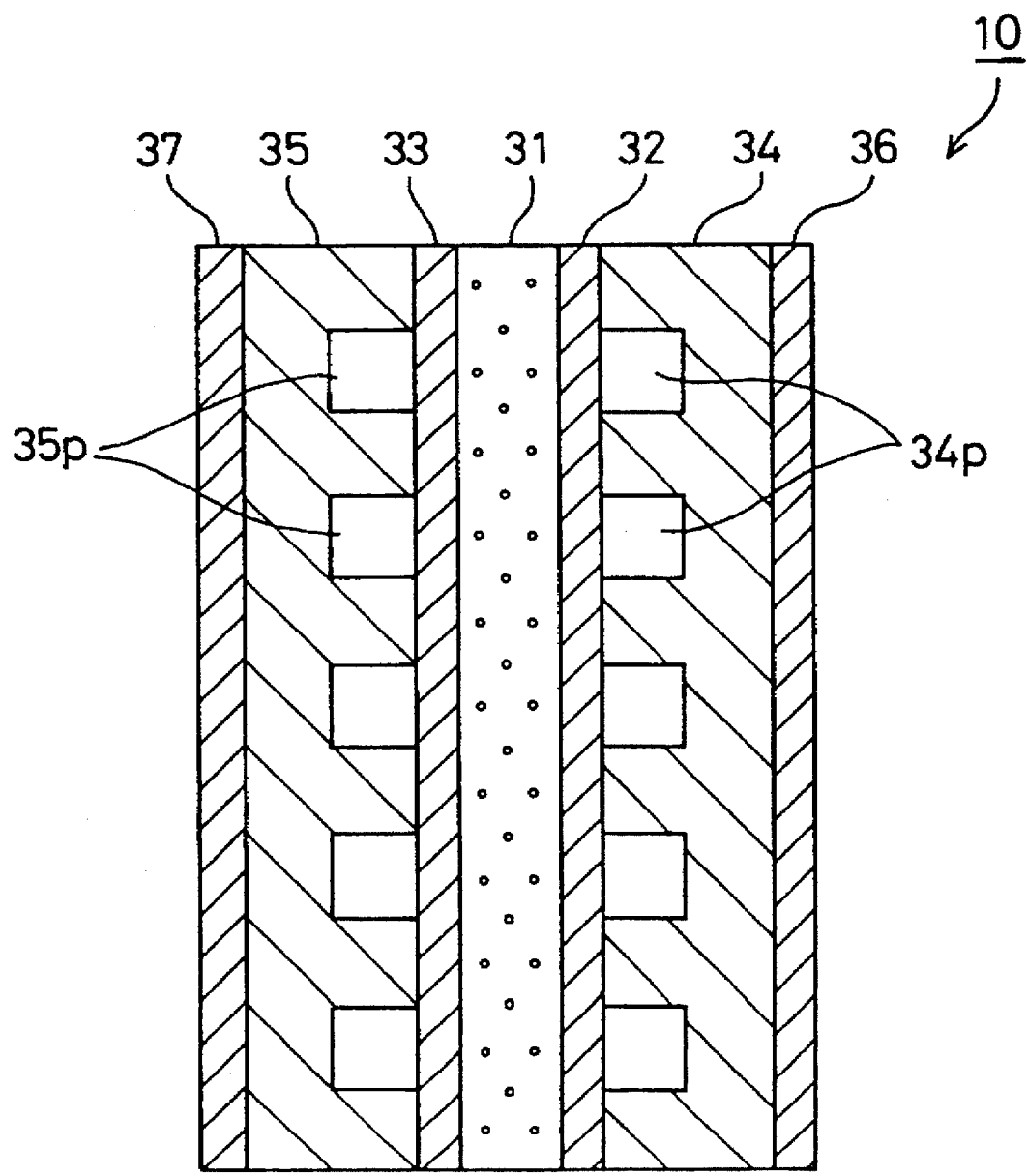
FIG. 2 is a cross sectional view showing the fuel cell 10.
Figure 3:
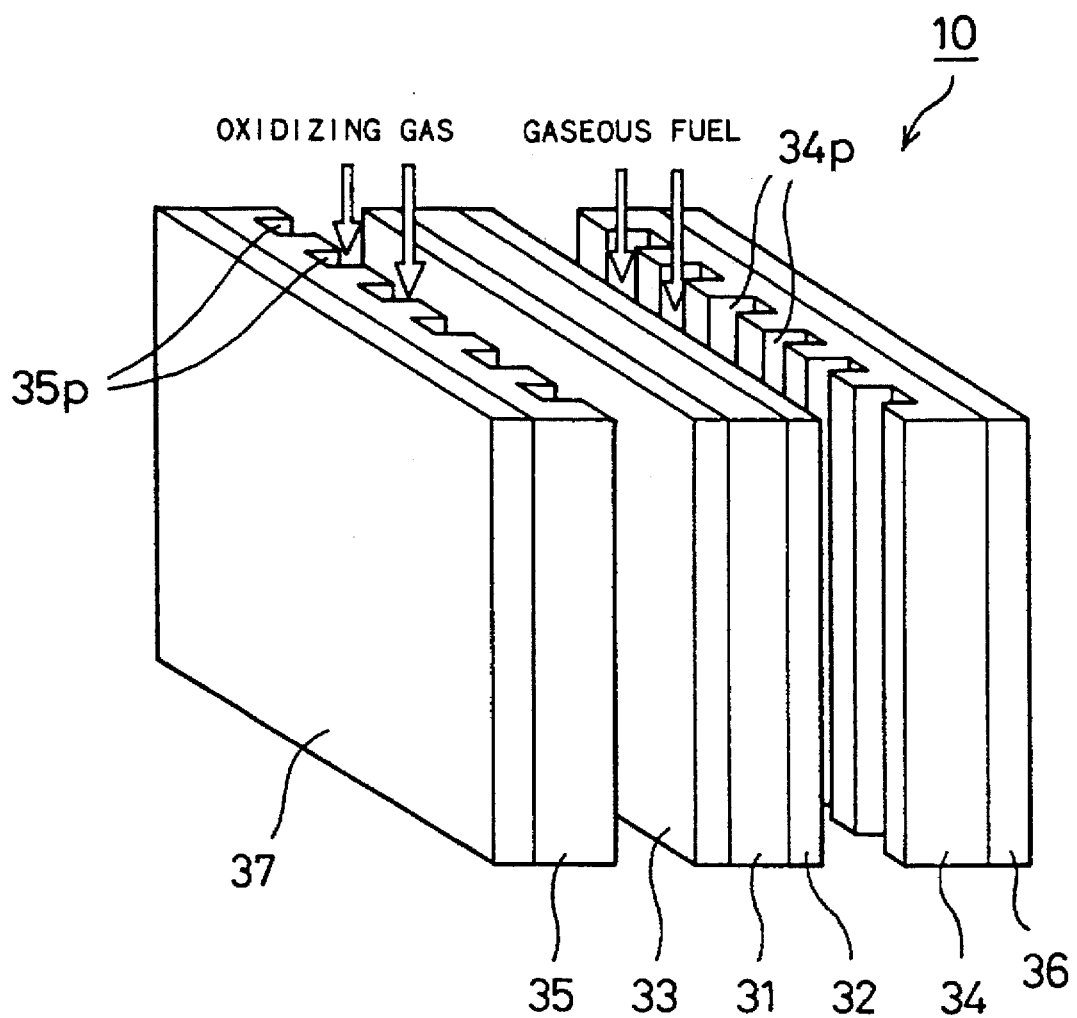
FIG. 3 is a decomposed perspective view illustrating the fuel cell 10.

A typical structure of the fuel cell 10 composed of a solid polymer electrolyte is described according to the cross sectional view of FIG. 2 and the decomposed perspective view of FIG. 3. The fuel cell 10 includes an electrolyte membrane 31, an anode 32 and a cathode 33 arranged across the electrolyte membrane 31 to work as gas diffusion electrodes, first and second separators 34 and 35 disposed respectively outside the anode 32 and the cathode 33 to constitute flow paths for flows of gaseous fuel and oxidizing gas, and first and second current collectors 36 and 37 disposed respectively outside the first and the second separators 34 and 35 to work as current-collecting electrodes.

The electrolyte membrane 31 is an ion-exchange membrane composed of polymer material, such as fluororesin, and has favorable electrical conductivity under wet condition. The anode 32 and the cathode 33 are composed of carbon cloth, which is woven of carbon fibers and contains carbon powder with platinum acting as a electrocatalyst.

The first and the second separators 34 and 35 are composed of dense carbon plates. The first separator 34 has a plurality of ribs, which constitute, in connection with the surface of the anode 32, a plurality of first channels 34p allowing flows of gaseous fuel. The second separator 35 also has a plurality of ribs, which constitute, in connection with the surface of the cathode 33, a plurality of second channels 35p allowing flows of oxidizing gas. The first and the second current collectors 36 and 37 are composed of copper (Cu).

Each single cell element of the fuel cell 10 has the structure described above. In actual configuration of the fuel cell 10, plural cell elements of first separator 34/anode 32/electrolyte membrane 31/cathode 33/second separator 35 are laid one upon another, and the first and the second current collectors 36 and 37 are disposed outside the plural cell elements.

Referring back to FIG. 1, the gaseous fuel supply conduit 18 and the gas discharge conduit 20 have a piping structure, which includes a main pipe 40 connecting with the reformer 16, first and second branch pipes 41 and 42 connecting with the main pipe 40, a combined pipe 43 connecting with the first and the second branch pipes 41 and 42, a first connecting pipe 44 branching off in the middle of the first branch pipe 41 and connecting with a first fuel gas inlet/outlet 10a on one side of the fuel cell 10, and a second connecting pipe 45 branching off in the middle of the second branch pipe 42 and connecting with a second fuel gas inlet/outlet 10b on the other side of the fuel cell 10. The first fuel gas inlet/outlet 10a is connected to a manifold (not shown) and further to the plurality of first channels 34p of the fuel cell 10 via the manifold. The second fuel gas inlet/outlet 10b is also connected to another manifold (not shown) and further to the plurality of first channels 34p of the fuel cell 10 via the manifold.

A first solenoid-operated on-off valve 51 (hereinafter referred to as solenoid valve) is disposed before a first joint 44a (on the side closer to the reformer 16) in the first branch pipe 41, whereas a second solenoid valve 52 is disposed after the first joint 44a. A third solenoid valve 53 is disposed before a second joint 45a (on the side closer to the reformer 16) in the second branch pipe 42, whereas a fourth solenoid valve 54 is disposed after the second joint 45a.

Figure 4A:
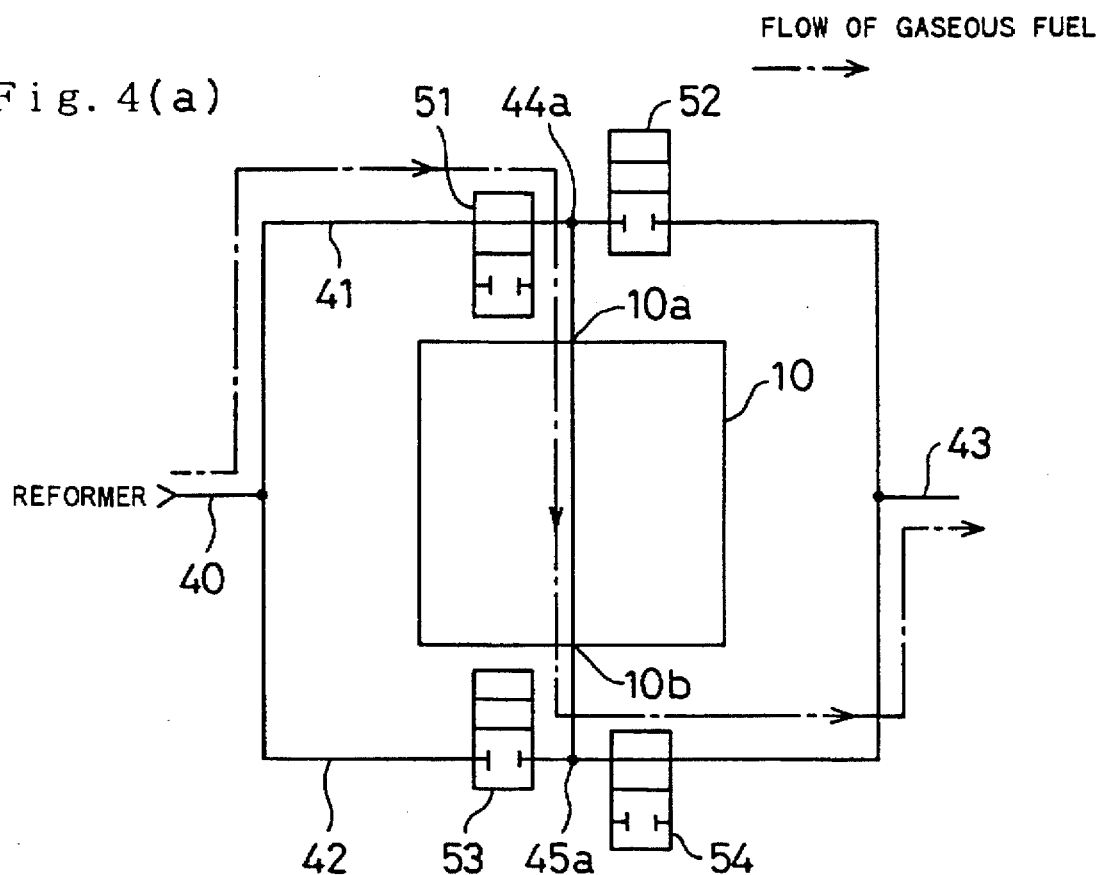
FIG. 4 shows flows of gaseous fuel based on the on-off operations of the first through the fourth solenoid valves 51 through 54.

In the gaseous fuel supply conduit 18 and the gas discharge conduit 20 thus constructed, while the first solenoid valve 51 and the fourth solenoid valve 54 are open and the second solenoid valve 52 and the third solenoid valve 53 are closed as shown in FIG. 4(a), a gaseous fuel supplied from the reformer 16 passes through the main pipe 40 and the first solenoid valve 51 of the first branch pipe 41 and goes from the first joint 44a to the first fuel gas inlet/outlet 10a as shown by the one-dot chain line. The gaseous fuel fed into the fuel cell 10 goes downward (in the drawing) and is consumed through electrochemical reactions at the anode 32. In general procedures, the amount of hydrogen contained in the gaseous fuel or hydrogen-rich gas supplied to the fuel cell 10 is greater than a required amount of hydrogen determined by calculation. Unconsumed hydrogen through the electrochemical reactions and carbon dioxide contained in the hydrogen-rich gas but not concerned in the electrochemical reactions are discharged as residual gas from the second fuel gas inlet/outlet 10b of the fuel cell 10. The residual gas then passes through the fourth solenoid valve 54 of the second branch pipe 42 via the second joint 45a and is discharged from the combined pipe 43 to the atmosphere. This flow of gaseous fuel is defined as flow in the normal direction. The fuel cell is maintained under such condition during initial operations.

Figure 4B:
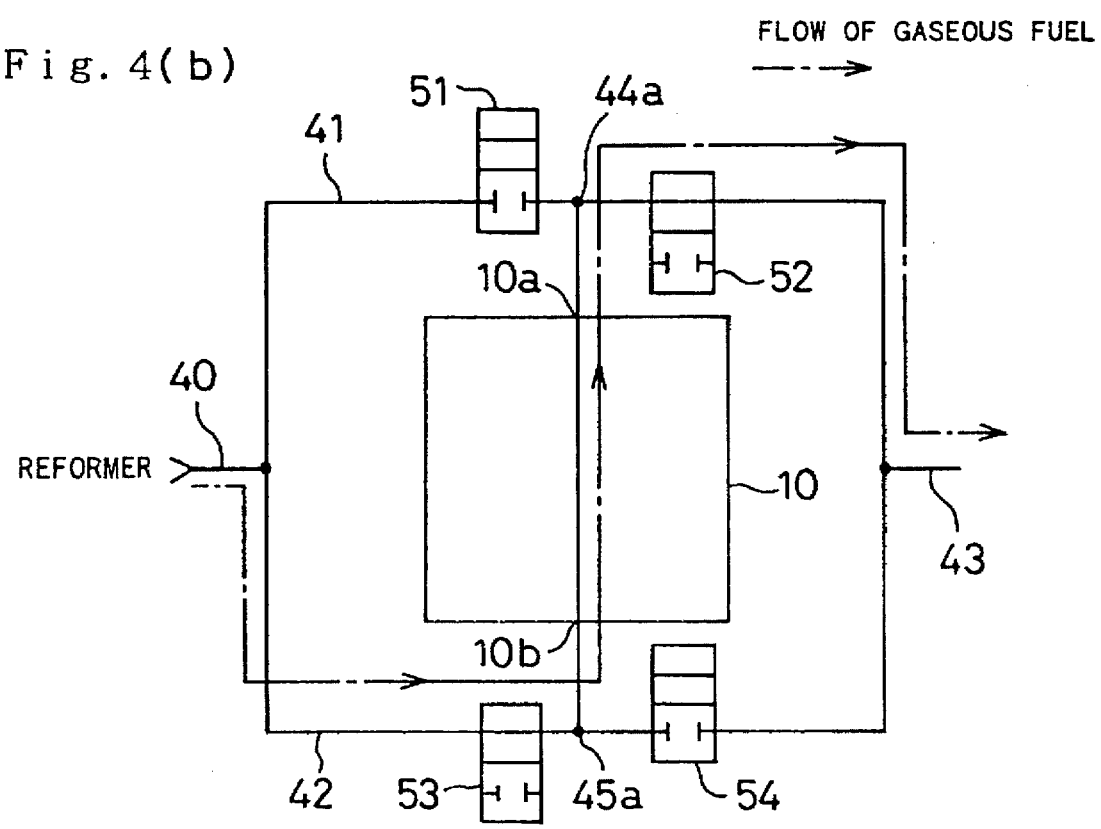

While the second solenoid valve 52 and the third solenoid valve 53 are open and the first solenoid valve 51 and the fourth solenoid valve 54 are closed as shown in FIG. 4(b), on the contrary, a gaseous fuel supplied from the reformer 16 passes through the main pipe 40 and the third solenoid valve 53 of the second branch pipe 42 and goes from the second joint 45a to the second fuel gas inlet/outlet 10b as shown by the one-dot chain line. The gaseous fuel fed into the fuel cell 10 goes upward (in the drawing) and is consumed through electrochemical reactions at the anode 32. The residual gas discharged from the first fuel gas inlet/outlet 10a of the fuel cell 10 passes through the second solenoid valve 52 of the first branch pipe 41 via the first joint 44a and is discharged from the combined pipe 43 to the atmosphere. This flow of gaseous fuel is defined as flow in the reverse direction.

Referring again to FIG. 1, the control system 22 arranged at the first channels 34p (see FIG. 2) works as a sensor for detecting conditions of the fuel cell 10. The control system 22 includes first and second temperature sensors 61 and 63 for detecting temperatures on the surface of the anode 32, and an electronic control unit 70 connecting with the first and the second temperature sensors 61 and 63. The first and the second temperature sensors 61 and 63 are thermocouples attached to both ends of one channel selected among the plurality of first channels 34p. The first temperature sensor 61 and the second temperature sensor 63 are respectively disposed in an upper half and a lower half in the drawing of FIG. 1.

The electronic control unit 70 constructed as a logic circuit with a microcomputer includes a CPU 72 for executing predetermined operations according to preset control programs, a ROM 74 which control programs and control data required for execution of various operations by the CPU 72 are previously stored in, a RAM 76 which various data required for execution of various operations by the CPU 72 are temporarily written in and read from, an input circuit 78 for receiving output signals from the first and the second temperature sensors 61 and 63, and an output circuit 79 for outputting on/off signals to the first through the fourth solenoid valves 51 through 54 based on the results of operations by the CPU 72.

The CPU 72 of the electronic control unit 70 receives the output signals from the first and the second temperature sensors 61 and 63 and calculates a temperature difference between both ends of the selected first channel 34p where the first and the second temperature sensors 61 and 63 are disposed. The CPU 72 controls on and off the first through the fourth solenoid valves 51 through 54 based on this temperature difference and changes the flow direction of gaseous fuel supplied to the first channels 34p in the fuel cell 10.

Figure 5:
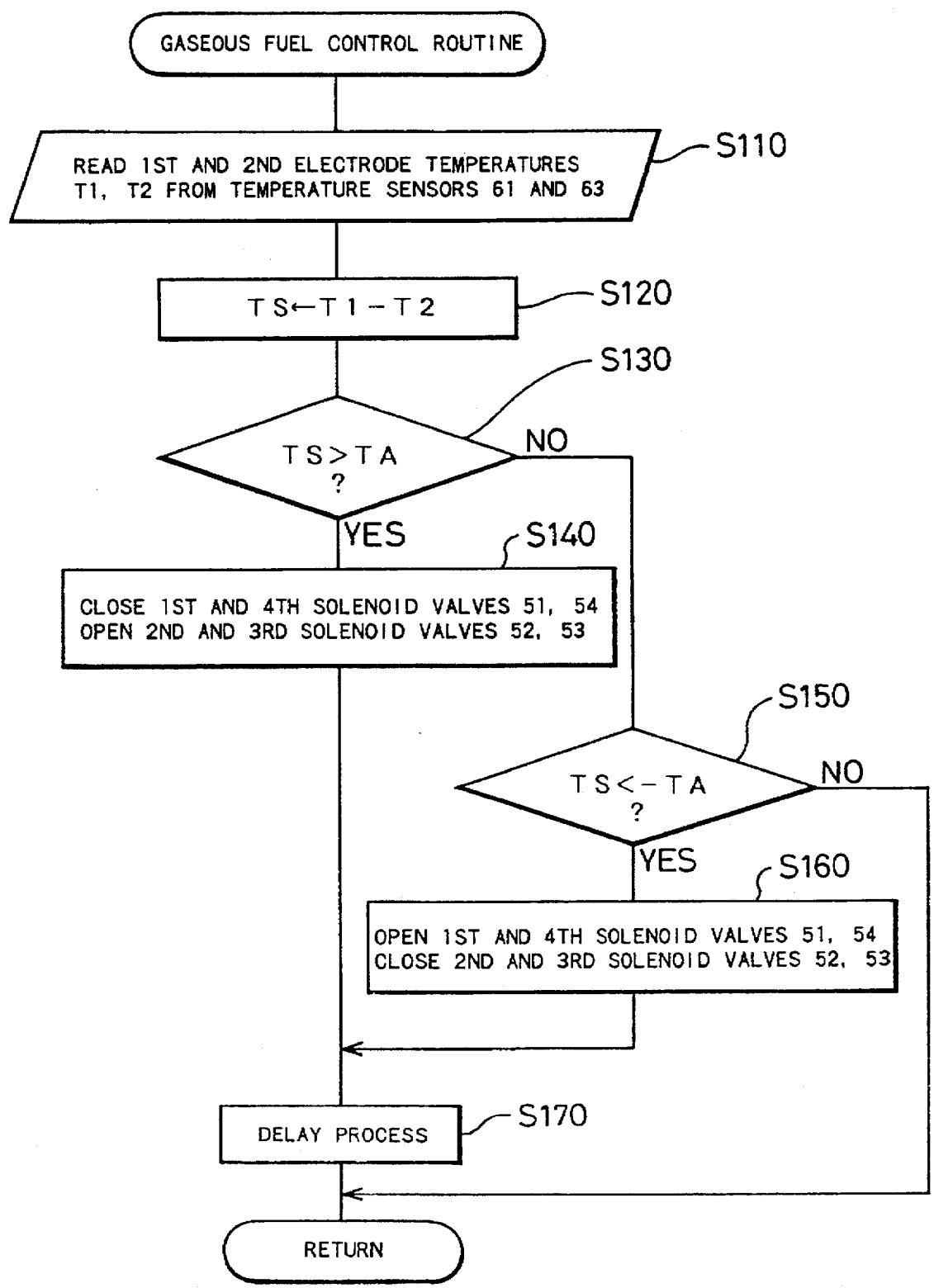
FIG. 5 is a flowchart showing a gaseous fuel control routine executed by the CPU 72 of the electronic control unit 70 in the first embodiment.

FIG. 5 is a flowchart showing a gaseous fuel control routine for changing the flow direction of gaseous fuel. The gaseous fuel control routine is executed repeatedly by the CPU 72 of the electronic control unit 70 at predetermined time intervals. When the program enters the routine, the CPU 72 reads a first electrode temperature T1 detected by the first temperature sensor 61 and a second electrode temperature T2 detected by the second temperature sensor 63 at step S110. A temperature difference TS is calculated by subtracting the second electrode temperature T2 from the first electrode temperature T1 at step S120. It is then determined whether the temperature difference TS is greater than a predetermined level TA (>0) at step S130.

When the answer is YES at step S130, that is, when the temperature difference TS is determined to be greater than the predetermined level TA, the program goes to step S140, at which the CPU 72 transfers valve-close signals to the first solenoid valve 51 and the fourth solenoid valve 54 while sending valve-open signals to the second solenoid valve 52 and the third solenoid valve 53 to close the first and the fourth solenoid valves 51 and 54 and open the second and the third solenoid valves 52 and 53. Such control allows the gaseous fuel to flow in the reverse direction in the fuel cell 10 as shown in FIG. 4(b).

The affirmative answer is obtained at step S130, when the first electrode temperature T1 detected by the first temperature sensor 61 is greater than the second electrode temperature T2 detected by the second temperature sensor 63 by a value greater than the predetermined level TA. Such a large temperature difference is ascribed to the fact that different places on the surface of the anode 32 have different degrees of poisoning. Places with higher degrees of poisoning have lower outputs, while electric current concentrates on places with lower degrees of poisoning. This results in a temperature decrease on the places with higher degrees of poisoning and a temperature increase on the places with lower degrees of poisoning.

As described previously, places closer to the outlet of the first channels 34p have higher concentrations of carbon monoxide. This means that the places closer to the outlet have higher degrees of poisoning and thereby lower temperatures. When the gaseous fuel flows in the normal direction as shown in FIG. 4(a), the first temperature sensor 61 disposed on the side of the first fuel gas inlet/outlet 10a detects a higher value for the first electrode temperature T1, whereas the second temperature sensor 63 disposed on the side of the second fuel gas inlet/outlet 10b detects a lower value for the second electrode temperature T2. This leads to the affirmative answer at step S130.

The process at step S140 under such conditions makes the gaseous fuel flow in the reverse direction from the second fuel gas inlet/outlet 10b to the first fuel gas inlet/outlet 10a as shown in FIG. 4(b). This back flow feeds the gaseous fuel with a relatively low concentration of carbon monoxide to a place in the vicinity of the second fuel gas inlet/outlet 10b previously poisoned by carbon monoxide. Poisoning of platinum electrocatalyst by carbon monoxide significantly depends upon the concentration of carbon monoxide. The lower concentration of carbon monoxide works to cancel the poisoning of the electrocatalyst and activates the electrochemical reactions in the vicinity of the second fuel gas inlet/outlet 10b, thereby raising the temperature to a normal level in the vicinity of the second fuel gas inlet/outlet 10b. This also cancels the excessive concentration of electric current on the first fuel gas inlet/outlet 10a, thereby lowering the temperature to a normal level in the vicinity of the first fuel gas inlet/outlet 10a. The process executed at step S140 gradually cancels the temperature difference TS between the second electrode temperature T2 detected by the second temperature sensor 63 disposed close to the second fuel gas inlet/outlet 10b and the first electrode temperature T1 detected by the first temperature sensor 61 disposed close to the first fuel gas inlet/outlet 10a.

The predetermined level TA used at step S130 for comparison with the temperature difference TS as a criterion for poisoning depends upon each fuel cell 10. Even in normal operations causing no poisoning of electrocatalyst, a significant temperature difference TS may be observed under the following conditions: a large electrode area of the fuel cell 10 or a large temperature difference between the inlet temperature of cooling water of the fuel cell 10 and the operation temperature of the fuel cell 10. In general procedures, the first and the second electrode temperatures T1 and T2 are detected first for a gas containing no carbon monoxide fed to the fuel cell 10 and then for a gaseous fuel containing a known concentration of carbon monoxide. A criterion for poisoning of electrocatalyst is determined based on these data of temperature differences between T1 and T2. In this embodiment, a temperature difference of 3° through 5° C. greater than the normal temperature difference TS between T1 and T2 is used as a criterion for poisoning of electrocatalyst.

Referring back to the flowchart of FIG. 5, when the answer is NO at step S130, that is, when the temperature difference TS is determined to be not greater than the predetermined level TA, the program proceeds to step S150 at which it is determined whether the temperature difference TS is smaller than −TA, an additive inverse or negative of the predetermined level TA. This is equivalent to determining whether a temperature difference −TS calculated by subtracting the first electrode temperature T1 from the second electrode temperature T2, that is, an additive inverse of the temperature difference TS, is greater than the predetermined level TA.

When the answer is YES at step S150, that is, when the additive inverse −TS is determined to be greater than the predetermined level TA, the program goes to step S160, at which the CPU 72 transfers valve-open signals to the first solenoid valve 51 and the fourth solenoid valve 54 while sending valve-close signals to the second solenoid valve 52 and the third solenoid valve 53 to open the first and the fourth solenoid valves 51 and 54 and close the second and the third solenoid valves 52 and 53. Such control allows the gaseous fuel to flow in the normal direction in the fuel cell 10 as shown in FIG. 4(a).

The affirmative answer is obtained at step S150, when the second electrode temperature T2 detected by the second temperature sensor 63 is greater than the first electrode temperature T1 detected by the first temperature sensor 61 by a value greater than the predetermined level TA. Such a large temperature difference is observed when poisoning of electrocatalyst arises again in normal operations of the fuel cell 10, after the flow direction of gaseous fuel is changed once through the process at steps S130 and S140 to cancel the poisoning of electrocatalyst, when the first electrode temperature T1 is greater than the second electrode temperature T2 by a value greater than the predetermined level TA. When the gaseous fuel flows in the reverse direction as shown in FIG. 4(b), places closer to the first fuel gas inlet/outlet 10a have higher concentrations of carbon monoxide, which leads to poisoning of electrocatalyst. The first electrode temperature T1 detected by the first temperature sensor 61 disposed on the side of the first fuel gas inlet/outlet 10a accordingly becomes lower than the second electrode temperature T2 detected by the second temperature sensor 63 disposed on the side of the second fuel gas inlet/outlet 10b. This leads to the affirmative answer at step S150.

The process at step S160 under such conditions makes the gaseous fuel flow in the normal direction from the first fuel gas inlet/outlet 10a to the second fuel gas inlet/outlet 10b as shown in FIG. 4(a). Change of the flow from the reverse direction to the normal direction feeds the gaseous fuel with a relatively low concentration of carbon monoxide to a place in the vicinity of the first fuel gas inlet/outlet 10a previously poisoned by carbon monoxide. The lower concentration of carbon monoxide works to cancel the poisoning of the electrocatalyst and activates the electrochemical reactions in the vicinity of the first fuel gas inlet/outlet 10a, thereby raising the temperature to a normal level in the vicinity of the first fuel gas inlet/outlet 10a. This also cancels the excessive concentration of electric current on the second fuel gas inlet/outlet 10b, thereby lowering the temperature to a normal level in the vicinity of the second fuel gas inlet/outlet 10b. The process executed at step S160 gradually cancels the temperature difference TS between the first electrode temperature T1 and the second electrode temperature T2.

After the process at step S140 or S160 for canceling the temperature difference, the program goes to step S170 at which the further process is delayed by a predetermined time sufficient for thorough cancellation of the temperature difference TS. The delay time depends upon the structure of each fuel cell 10, for example, the length and diameter of piping of the fuel cell, positions of the on-off valves, the gas flow rate, and the gas pressure. It is thus essential to measure a time required for thorough cancellation of electrocatalyst poisoning for each fuel cell. The delay time is preferably set 1.2 through 1.5 times the required time for thorough cancellation. After the process at step S170, the program goes to RETURN to exit from the routine. When the answer is NO at step S150, the program also goes to RETURN to exit from the routine.

The fuel cell generator system 1 of the first embodiment detects the temperatures T1 and T2 on both ends of a selected first channel 34p with the first and the second temperature sensors 61 and 63 and checks for poisoning of electrocatalyst on the anode 32 based on the temperature difference TS between T1 and T2. The temperature difference on the surface of the anode is closely related to the poisoning of electrocatalyst. This system accordingly determines the degree of poisoning of the electrocatalyst with high accuracy.

When poisoning of electrocatalyst is observed, the fuel cell generator system 1 controls on and off the first through the fourth solenoid valve 51 through 54 to change the flow direction of gaseous fuel running through the first channels 34p arranged along the anode 32. The reversion of flow direction changes the outlet of reactive gas having a higher degree of poisoning to the inlet of reactive gas. This allows the places with higher degrees of poisoning to be exposed to the reactive gas with a relatively low concentration of carbon monoxide, so as to cancel the existing poisoning and prevent further poisoning. This system definitely cancels poisoning of electrocatalyst in the fuel cell 10 without delay.

In actual structure of the first embodiment, the first solenoid valve 51 and the second solenoid valve 52 are disposed at the closest possible position to the first joint 44a, while the third solenoid valve 53 and the fourth solenoid valve 54 are at the closest possible position to the second joint 45a. The less amount of residual gas between the first and the second joints 44a and 45a and the first through the fourth solenoid valves 51 through 54 reduces the amount of residual gas flown into the fuel cell 10 in the process of reversion of the flow direction. This effectively protects the fuel cell 10 from adverse effects of residual gas.

Figure 6:
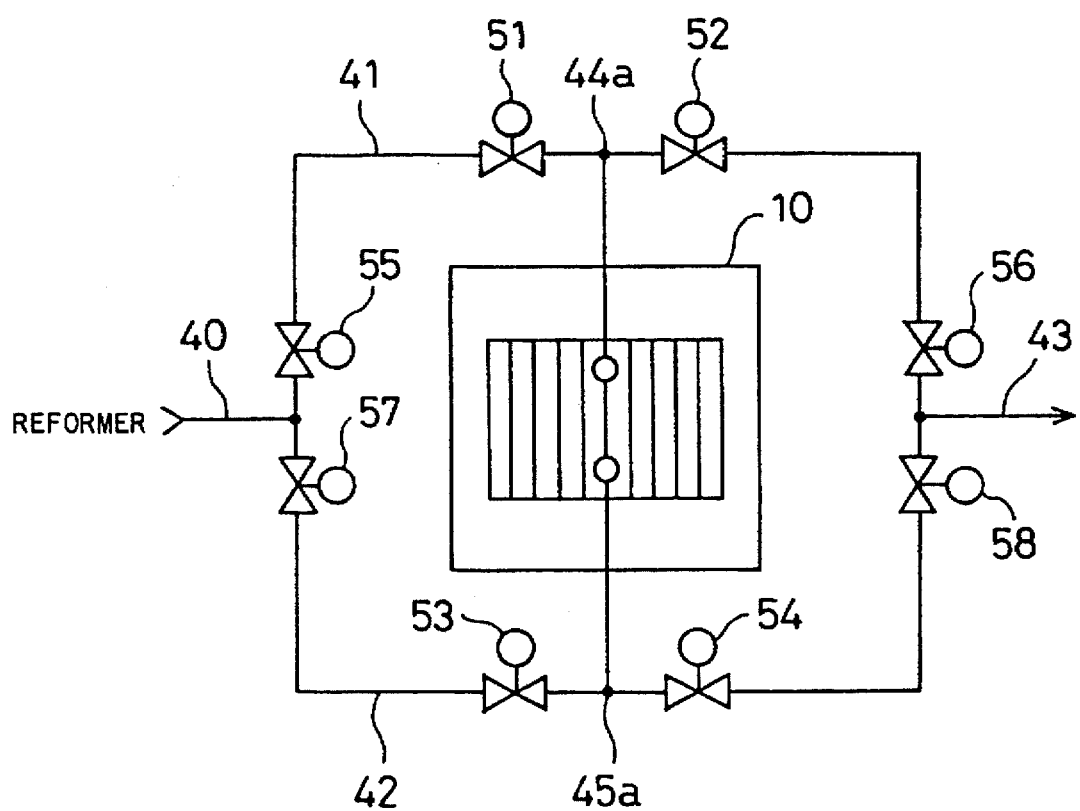
FIG. 6 is a block diagram schematically showing a modification of the first embodiment.

Although the first embodiment has the four solenoid valves 51 through 54, another four solenoid valves may further be added. As shown in FIG. 6, a fifth solenoid valve 55 is disposed on the first branch pipe 41 at a position close to the main pipe 40, and a sixth solenoid valve 56 on the first branch pipe 41 at a position close to the combined pipe 43. A seventh solenoid valve 57 is disposed on the second branch pipe 42 at a position close to the main pipe 40, and an eighth solenoid valve 58 on the second branch pipe 42 at a position close to the combined pipe 43. A set of the first solenoid valve 51 and the fifth solenoid valve 55, that of the second solenoid valve 52 and the sixth solenoid valve 56, that of the third solenoid valve 53 and the seventh solenoid valve 57, and that of the fourth solenoid valve 54 and the eighth solenoid valve 58 are respectively controlled on and off simultaneously. This structure substantially eliminates the residual gas in the first branch pipe 41 and the second branch pipe 42, thus more effectively protecting the fuel cell 10 from adverse effects of the residual gas.

In place of the structure of the first embodiment with the four solenoid valves 51 through 54, an alternative structure changes the flow direction by operating three-way valves or three-port valves disposed at the first joint 44a of the first branch pipe 41 and the second joint 45a of the second branch pipe 42.

In the first embodiment, the reactivity of electrocatalyst is checked according to the first and the second electrode temperatures T1 and T2 detected by the first and the second temperature sensors 61 and 63. In a modified structure, the reactivity of electrocatalyst is checked with two electrometers for detecting electric potentials on the surface of the anode 32. The first electrometer is disposed at the position of the first temperature sensor 61 and the second electrometer at the position of the second temperature sensor 63. A difference between electric potentials E1 and E2 detected by the first and the second electrometers is used as a criterion for poisoning of electrocatalyst. The potential difference on the surface of the anode 32 corresponds to the difference in reactivity of electrocatalyst between at the inlet and at the outlet of the gaseous fuel on the electrode. Like the first embodiment, this modified structure determines the degree of poisoning of the electrocatalyst with high accuracy.

Figure 7:
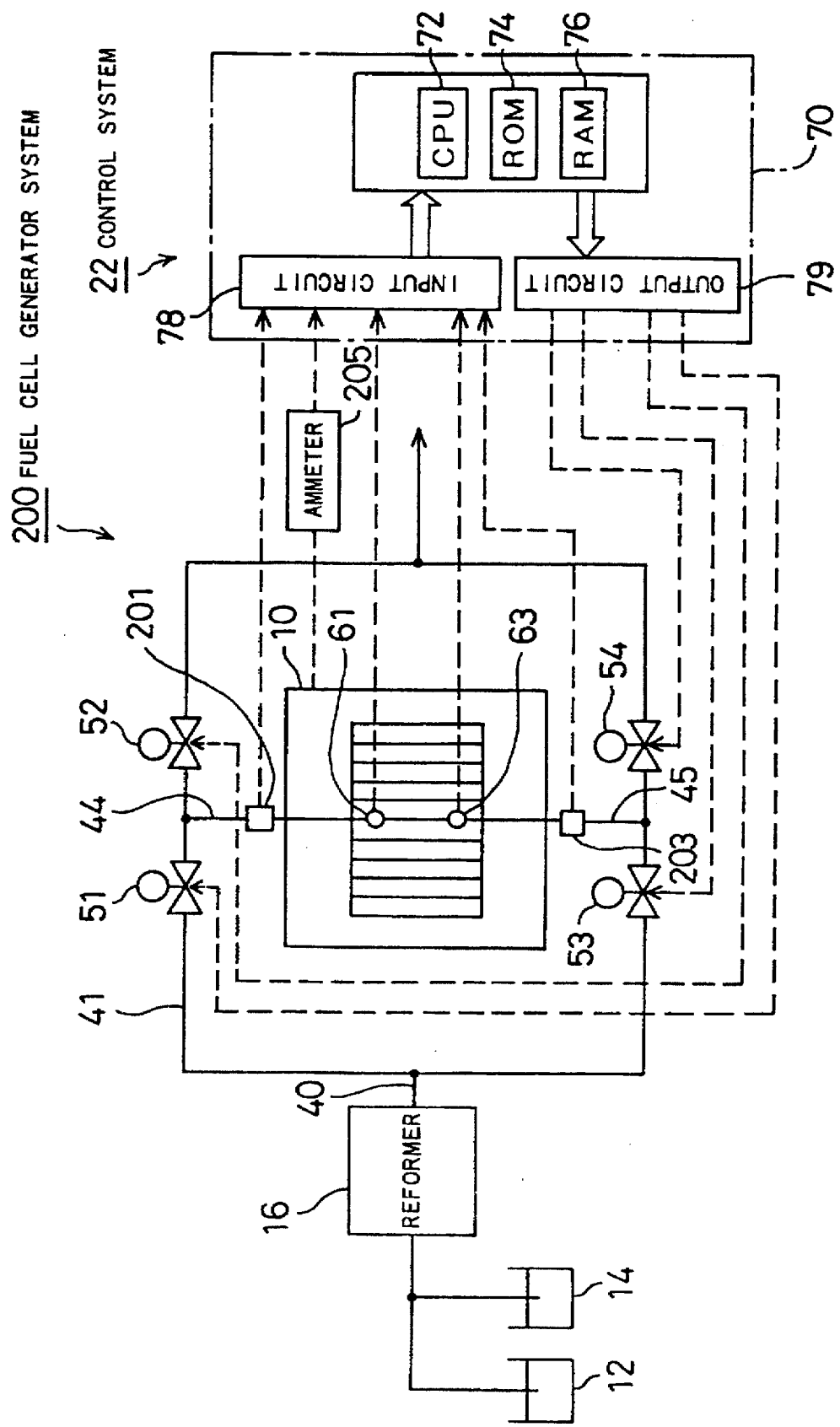
FIG. 7 is a block diagram schematically illustrating a fuel cell generator system 200 as a second embodiment according to the invention.

FIG. 7 is a block diagram schematically illustrating a fuel cell generator system 200 as a second embodiment according to the invention. The fuel cell generator system 200 has a similar structure to that of the first embodiment, except first and second flow sensors 201 and 203 disposed on the first connecting pipe 44 and on the second connecting pipe 45 for detecting a supply of the gaseous fuel to the fuel cell 10 and an ammeter 205 connecting with the fuel cell 10 for detecting output current from the fuel cell 10. The first and the second flow sensors 201 and 203 and the ammeter 205 are electrically connected to the electronic control unit 70. The CPU 72 of the electronic control unit 70 measures the supply of gaseous fuel applied on the anode 32 and determines whether the gaseous fuel control routine of the first embodiment is to be executed or prohibited.

Figure 8:
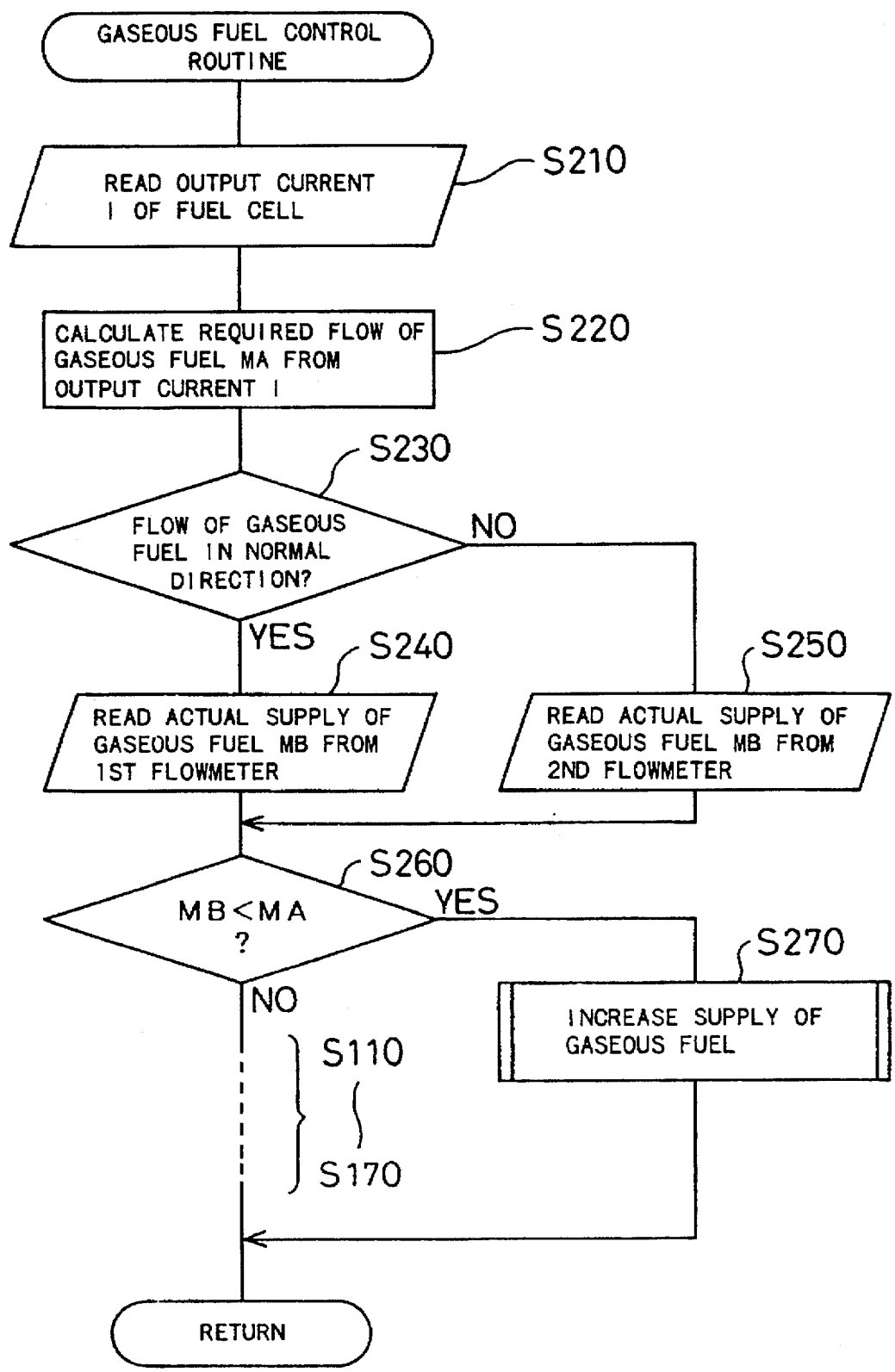
FIG. 8 is a flowchart showing a gaseous fuel control routine executed by the CPU 72 of the electronic control unit 70 in the second embodiment.

FIG. 8 is a flowchart showing a gaseous fuel control routine executed in the second embodiment. The CPU 72 of the electronic control unit 70 repeatedly executes the gaseous fuel control routine at predetermined time intervals. When the program enters the routine, the CPU 72 reads an output current I of the fuel cell 10 from the ammeter 205 at step S210. The CPU 72 subsequently calculates a flow of gaseous fuel MA theoretically required for the fuel cell 10 from the output current I at step S220. The program then proceeds to step S230 at which it is determined whether the gaseous fuel in the fuel cell 10 flows in the normal direction shown in FIG. 4(a) or in the reverse direction shown in FIG. 4(b).

When the flow of gaseous fuel is determined to be in the normal direction at step S230, the program goes to step S240 at which the CPU 72 reads from the first flow sensor 201 an actual supply of gaseous fuel MB to the fuel cell 10 via the first fuel gas inlet/outlet 10a. When the flow of gaseous fuel is determined to be in the reverse direction at step S230, on the contrary, the program goes to step S250 at which the CPU 72 reads from the second flow sensor 203 an actual supply of gaseous fuel MB to the fuel cell 10 via the second fuel gas inlet/outlet 10b. After the process at step S240 or S250, the program goes to step S260 at which the actual supply of gaseous fuel MB read either at step S240 or at step S250 is compared with the required flow of gaseous fuel MA calculated at step S220.

When the actual supply of gaseous fuel MB is determined to be less than the required flow MA of gaseous fuel at step S260, the program goes to step S270 at which the flow of gaseous fuel fed to the fuel cell 10 is increased. The process of increasing the supply of gaseous fuel is executed by a known method of controlling the reformer 16, the methanol reservoir 12, and the water reservoir 14, which is not described here. After the process at step S270, the program goes to RETURN to exit from the routine.

When the actual supply of gaseous fuel MB is determined to be not less than the required flow MA of gaseous fuel at step S260, on the contrary, the supply of gaseous fuel to the fuel cell 10 is sufficient and there is no possibility of error in determination of the degree of electrocatalyst poisoning. The program accordingly goes to step S110 in the flowchart of FIG. 5 and executes the process of steps S110 through S170 of the first embodiment before exiting from the routine.

The fuel cell generator system 200 of the second embodiment does not execute determination of the degree of electrocatalyst poisoning based on the data of the first and the second temperature sensors 61 and 63 nor take any countermeasure against the poisoning, when the actual supply of gaseous fuel MB to the fuel cell 10 is insufficient and less than the required flow MA. The difference in reactivity of electrocatalyst on the anode 32 depends upon the degree of poisoning of the electrocatalyst, when a sufficiently amount of gaseous fuel is fed to the surface of the anode 32. An insufficient supply of gaseous fuel due to abrupt loading worsens the reactivity of electrocatalyst which is not poisoned significantly. When the supply of gaseous fuel is insufficient, there is a possibility of error in determination of the degree of electrocatalyst poisoning. The structure of the second embodiment does not determine the degree of electrocatalyst poisoning under the condition of insufficient supply of gaseous fuel, thereby enhancing accuracy of determination of the degree of poisoning and efficiently taking the appropriate countermeasure against the electrocatalyst poisoning.

In the second embodiment, the actual supply of gaseous fuel MB to the fuel cell 10 is detected by selectively using the two flow sensors 201 and 203 respectively disposed on the first connecting pipe 44 and the second connecting pipe 45 on either side of the first channels 34p. According to an alternative structure, the actual supply of gaseous fuel MB to the fuel cell is detected with a flow sensor disposed immediately after the reformer 16 on the main pipe 40. In another structure with a mass flow controller disposed on the main pipe 40 for the purpose of flow control, the actual supply of gaseous fuel MB is determined according to a control signal to the mass flow controller. In still another structure, an evolution of hydrogen or the actual supply of gaseous fuel MB is determined according to the supplies of methanol and water to the reformer 16 and the temperature of reforming electrocatalyst charged into the reformer 16.

The structure of the second embodiment does not determine the degree of electrocatalyst poisoning, when the actual supply of gaseous fuel MB to the fuel cell 10 is less than the required flow MA. A modified structure calculates a deviation ΔM of the actual supply of gaseous fuel MB from the required flow MA and varies the predetermined level TA, used at steps S130 and S150 (see FIG. 5) as the criterion for electrocatalyst poisoning, according to the deviation ΔM. This modified structure further enhances the accuracy in determination of the degree of electrocatalyst poisoning.

Figure 9:
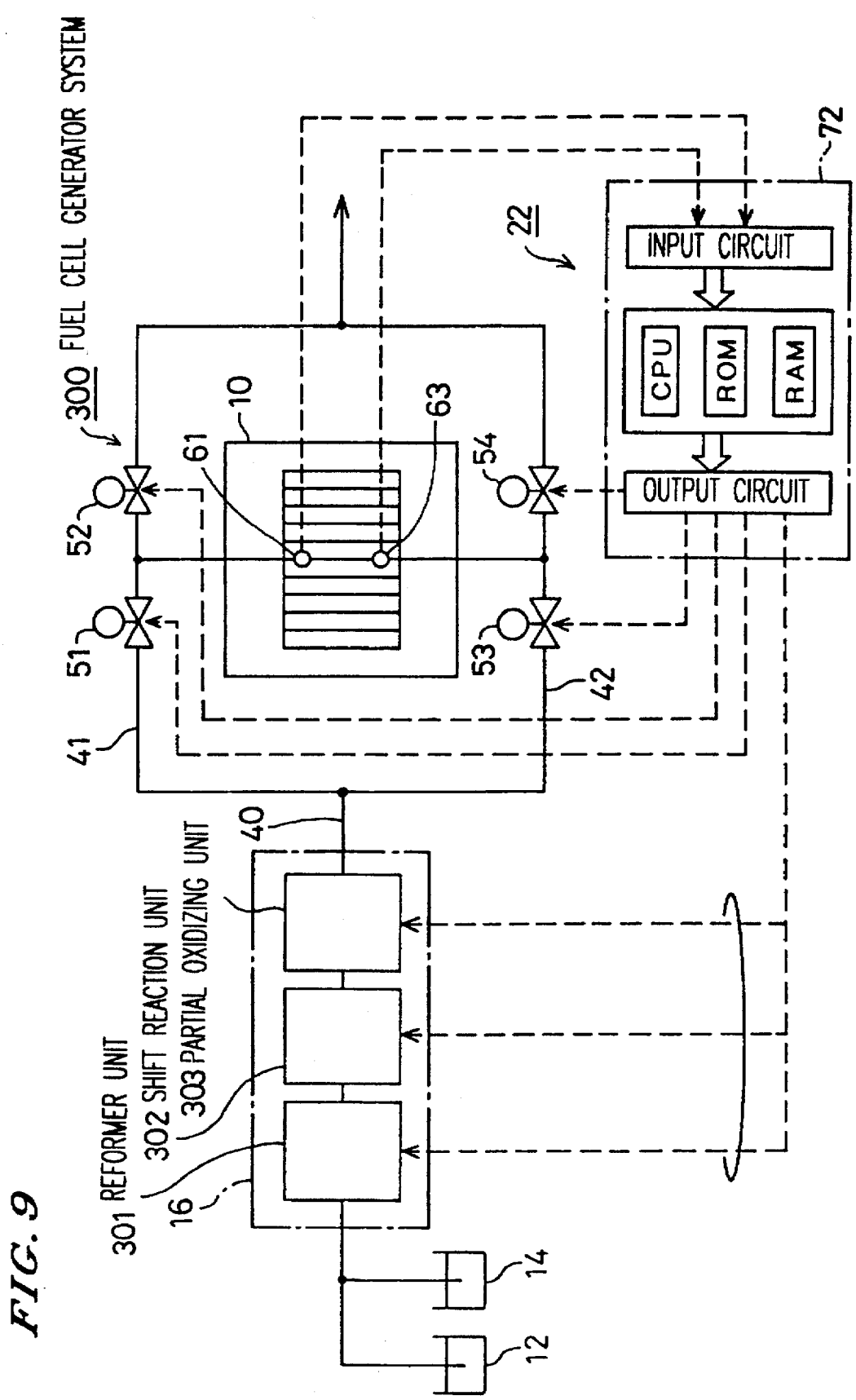
FIG. 9 is a block diagram schematically illustrating a fuel cell generator system 300 as a third embodiment according to the invention.

FIG. 9 is a block diagram schematically illustrating a fuel cell generator system 300 as a third embodiment according to the invention. The fuel cell generator system 300 has a similar structure to that of the first embodiment, except that a reformer unit 301, a shift reaction unit 302, and a partial oxidizing unit 303 constituting the reformer 16 are electrically connected with the electronic control unit 70. The CPU 72 of the electronic control unit 70 controls the reformer unit 301, the shift reaction unit 302, and the partial oxidizing unit 303 to vary the quality of hydrogen-rich gas fed as the gaseous fuel.

Figure 10:
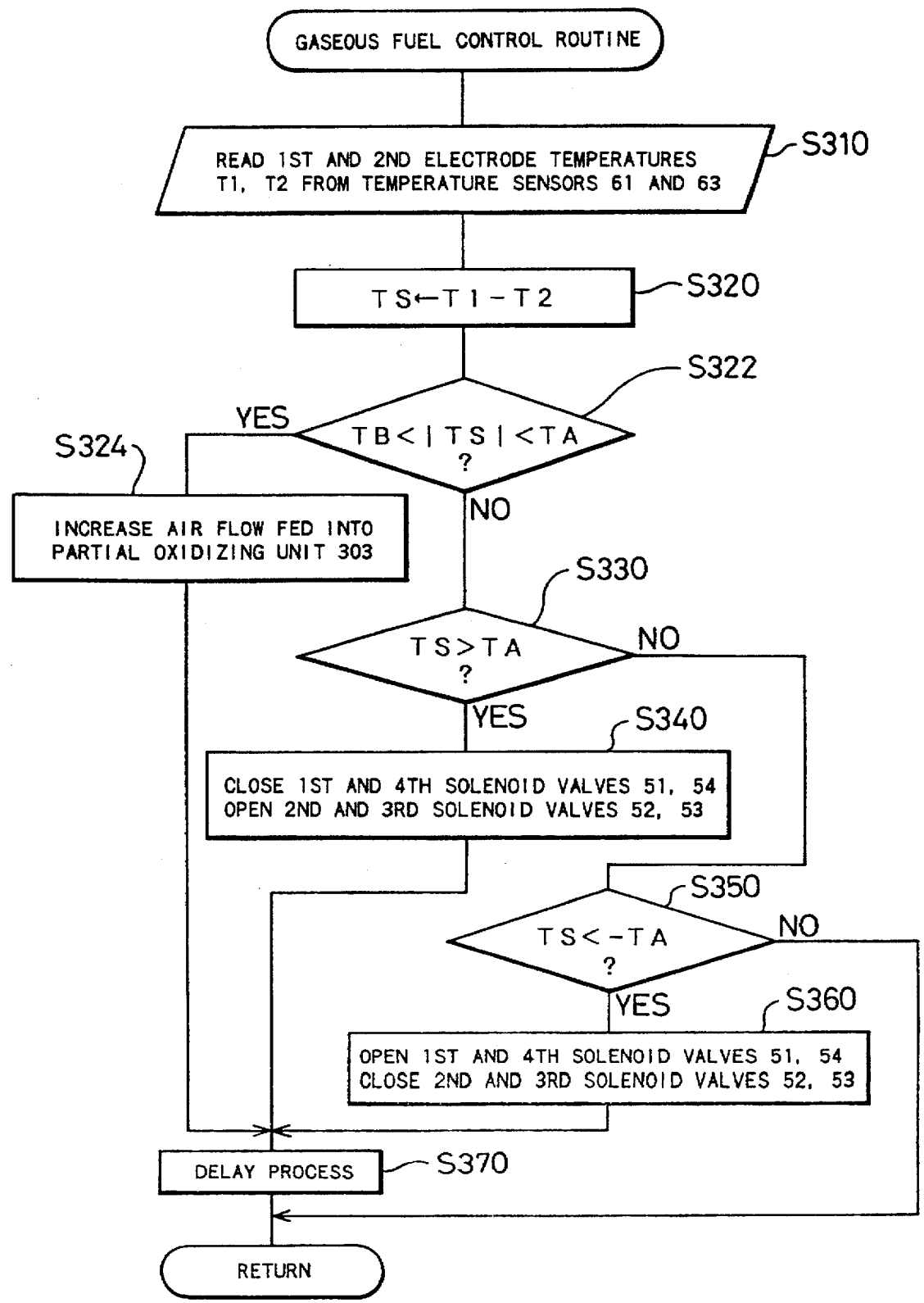
FIG. 10 is a flowchart showing a gaseous fuel control routine executed by the CPU 72 of the electronic control unit 70 in the third embodiment.

FIG. 10 is a flowchart showing a gaseous fuel control routine executed by the CPU 72 of the electronic control unit 70 in the third embodiment. The gaseous fuel control routine is repeatedly executed at predetermined time intervals. When the program enters the routine, the CPU 72 reads a first electrode temperature T1 and a second electrode temperature T2 from the first temperature sensor 61 and the second temperature sensor 63, and calculates a temperature difference TS between T1 and T2 at steps S310 and S320, in the same manner as steps S110 and S120 of the first embodiment.

The program then goes to step S322 at which it is determined whether the absolute value of the temperature difference TS calculated at step S320 is less than a predetermined first value TA and greater than a predetermined second value TB (>0). The predetermined first value TA is identical with the predetermined level TA used at step S130 in the first embodiment and used as the criterion for electrocatalyst poisoning. The predetermined second value TB is smaller than the predetermined first value TA and used as a criterion for an indication of electrocatalyst poisoning, that is, a pre-stage of electrocatalyst poisoning or light electrocatalyst poisoning. In this embodiment, the predetermined first value TA is 3° through 5° C. like the first embodiment, and the predetermined second value TB is 2° through 3° C.

When the answer is YES at step S322, the program proceeds to the step S324 at which the CPU 72 sends a control signal to the partial oxidizing unit 303 of the reformer 16 to increase the air flow fed into the partial oxidizing unit 303. The partial oxidizing unit 303 is operated at temperatures of 100° through 200° C., and the increase in air flow fed to the reforming gas accelerates the reaction of oxidizing carbon monoxide included in the reforming gas to carbon dioxide.

The absolute value of the temperature difference TS greater than TB and less than TA represents a start of poisoning of electrocatalyst on the anode 32 of the fuel cell 10. An increase in air flow fed to the partial oxidizing unit 303 of the reformer 16 accelerates the reaction of oxidizing carbon monoxide included in the reforming gas to carbon dioxide, thereby lowering the concentration of carbon monoxide included in the reforming gas supplied from the partial oxidizing unit 303. The reforming gas with a relatively low concentration of carbon monoxide fed as the gaseous fuel to the fuel cell effectively cancels an indication of electrocatalyst poisoning.

When the answer is NO at step S322, that is, when the absolute value of the temperature difference TS is not greater than TB or not less than TA, the program proceeds to step S330. The process executed at steps S330 through S370 is substantially equivalent to that executed at steps S130 through S170 in the first embodiment. When the temperature difference TS is determined to be greater than the predetermined first value TA at step S330, the program goes to step S340 at which the flow of gaseous fuel in the fuel cell 10 is changed to the reverse direction as shown in FIG. 4 (b). When the temperature difference TS is determined to be smaller than an additive inverse or negative of the predetermined first value TA at step S350, on the other hand, the program goes to step S360 at which the flow of gaseous fuel in the fuel cell 10 is changed to the normal direction as shown in FIG. 4(a). After the process at step S340 or S360, the further processing is delayed by a predetermined time at step S370. When the answer is negative at all steps S322, S330, and S350, that is, when the temperature difference TS is between −TB and TB, the program assumes the condition of no electrocatalyst poisoning and directly goes to RETURN to exit from the routine.

When the indication of electrocatalyst poisoning is effectively canceled at step S324, the program also goes to step S370 for the delay process to complete the improvement and then to RETURN to exit from the routine.

The fuel cell generator system 1 of the third embodiment increases the air flow fed into the partial oxidizing unit 303 of the reformer 16 under the condition of small degree of electrocatalyst poisoning on the anode 32. Although temporarily lowering the efficiency of reforming in the reformer 16, this structure allows the gaseous fuel with a relatively low concentration of carbon monoxide to be fed into the fuel cell 10, so as to effectively cancel the small degree of electrocatalyst poisoning. When the degree of electrocatalyst poisoning is relatively large, the reversion of flow direction of gaseous flow acts to cancel the electrocatalyst poisoning, like the first embodiment. The structure of the second embodiment thus effectively and efficiently cancels the poisoning of electrocatalyst according to its degree.

An increase in air flow fed into the reforming gas in the partial oxidizing unit 303 accelerates oxidation as given below:

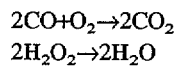

The oxidation relatively lowers a partial pressure of hydrogen included in the reforming gas, and thereby slightly reduces the output voltage of the fuel cell 10. According to a preferable application of the third embodiment, the air flow fed into the partial oxidizing unit 303 is returned to its stationary level when the temperature difference TS between the first electrode temperature T1 and the second electrode temperature T2 becomes not greater than the predetermined second value TB.

The structure of the third embodiment lowers the concentration of carbon monoxide included in the reforming gas by controlling the air flow fed into the partial oxidizing unit 303. An alternative structure controls the reaction temperature in the reformer unit 301 or that in the shift reaction unit 302 to lower the concentration of carbon monoxide included in the reforming gas with some drop in reforming efficiency.

Another possible structure for canceling the electrocatalyst poisoning without a drop in reforming efficiency of the reformer 16 temporarily increases the supply pressure of gaseous fuel fed to the fuel cell 10. This structure temporarily raises the gas pressure over the ideal level to enhance the anti-CO poisoning ability of electrocatalyst with a temporary drop in efficiency of the fuel cell 10. This effectively cancels a small degree of electrocatalyst poisoning and inhibits further poisoning.

Figure 11:
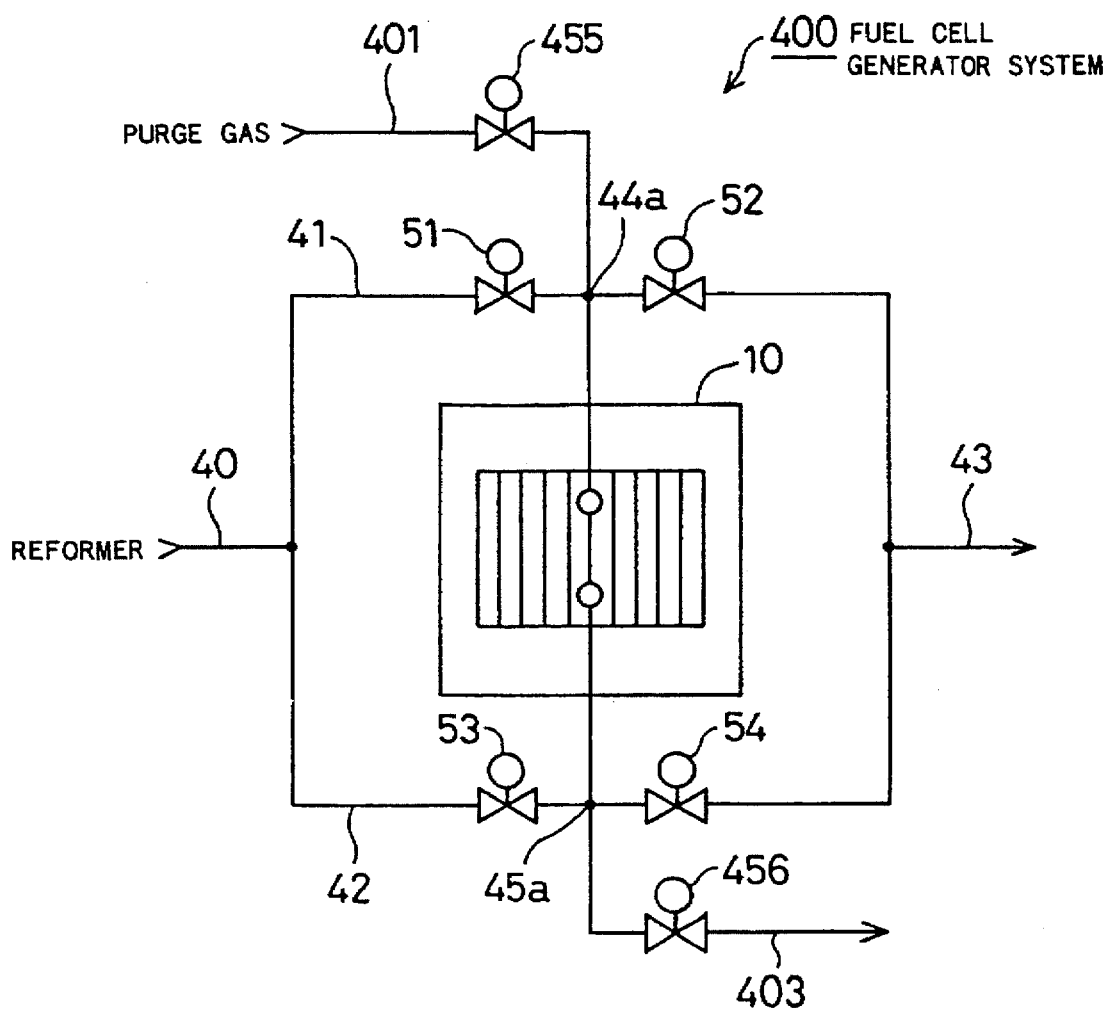
FIG. 11 is a block diagram schematically illustrating a fuel cell 10 and peripheral elements in a fuel cell generator system 400 as a fourth embodiment according to the invention.

FIG. 11 is a block diagram schematically illustrating a fuel cell 10 and peripheral elements in a fuel cell generator system 400 as a fourth embodiment according to the invention. The fuel cell generator system 400 has a similar structure to that of the first embodiment, except a first purge pipe 401 further connecting with the first joint 44a of the first branch pipe 41, a second purge pipe 403 further connecting with the second joint 45a of the second branch pipe 42, and first and second additional solenoid valves 455 and 456 disposed on the first purge pipe 401 and the second purge pipe 403.

The first purge pipe 401 constitutes a supply conduit for a purge gas, whereas the second purge pipe 403 a discharge conduit for the purge gas. Purge gas used herein is nitrogen or an inert gas like argon. The electronic control unit 70 (not shown) having the same structure as that of the first embodiment fills the fuel cell 10 with purge gas, instead of gaseous fuel, by opening the first and the second additional solenoid valves 455 and 456 after closing the first and the second solenoid valves 51 and 52 on the first branch pipe 41 and the third and the fourth solenoid valves 53 and 54 on the second branch pipe 42. This process stops actions of the fuel cell 10 and discharges hydrogen gas remaining in the fuel cell 10 to keep the fuel cell 10 safely.

Figure 12:
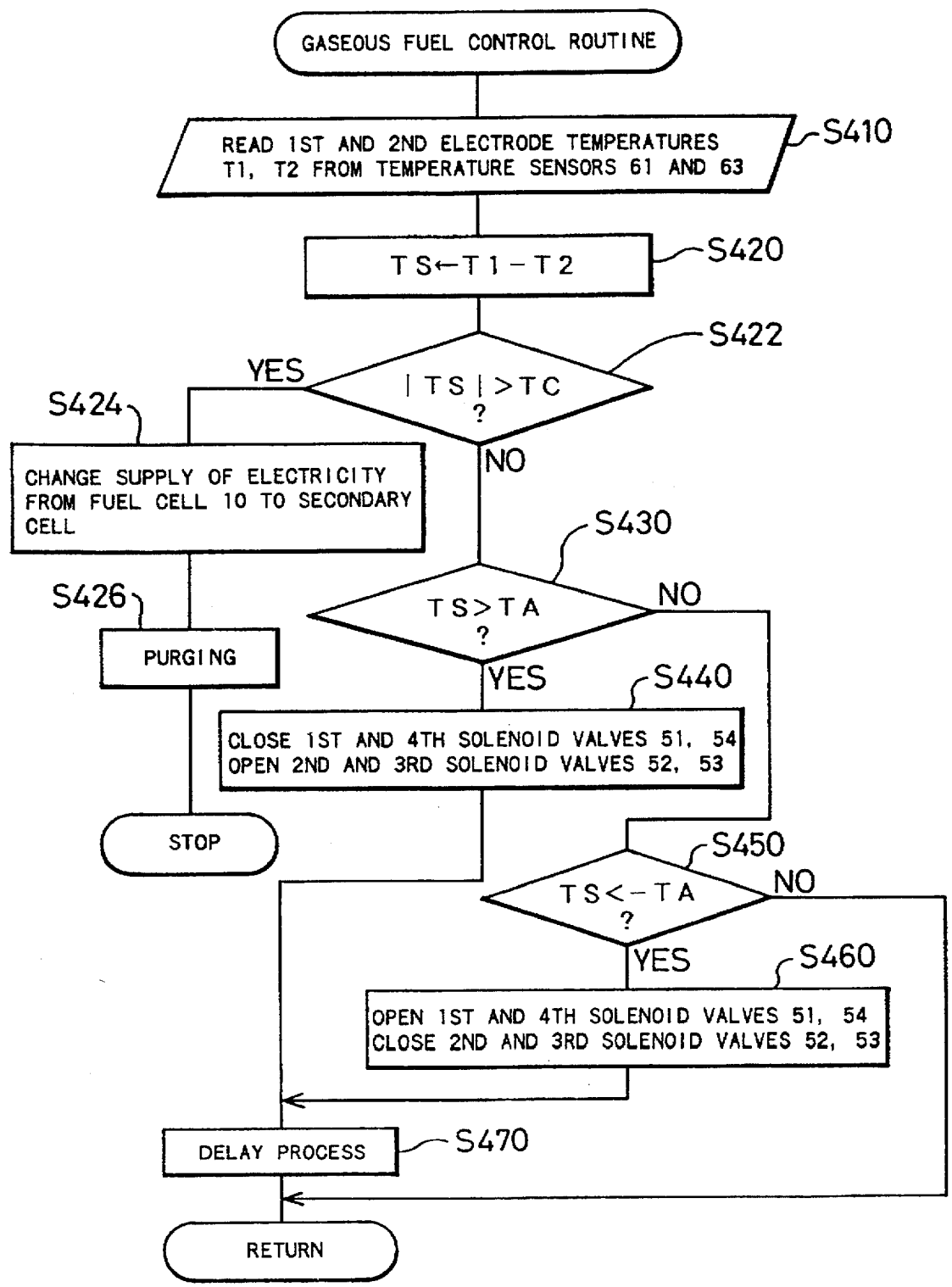
FIG. 12 is a flowchart showing a gaseous fuel control routine executed by the CPU 72 of the electronic control unit 70 in the fourth embodiment.

FIG. 12 is a flowchart showing a gaseous fuel control routine executed in the fourth embodiment. This routine includes the purging process for filling the fuel cell 10 with a purge gas. The gaseous fuel control routine is executed repeatedly by the CPU 72 of the electronic control unit 70 at predetermined time intervals. When the program enters the routine, the CPU 72 reads a first electrode temperature T1 and a second electrode temperature T2 from the first temperature sensor 61 and the second temperature sensor 63, and calculates a temperature difference TS between T1 and T2 at steps S410 and S420, in the same manner as steps S110 and S120 of the first embodiment.

The program then proceeds to step S422 at which the absolute value of the temperature difference TS calculated at step S410 is compared with a predetermined third value TC (>0). The predetermined third value TC is used as a criterion for a significantly high degree of electrocatalyst poisoning, which makes it difficult to continue generation of electricity from the fuel cell 10. In this embodiment, the predetermined third value TC is 5° through 10° C.

When the answer at step S422 is affirmative, the program goes to step S424 at which the CPU 72 switches a supply of electricity to a load (not shown) from the fuel cell 10 to a secondary cell like an lead-acid accumulator (not shown) connected to the fuel cell 10 in parallel, and safely inactivates the load. The purging process is subsequently carried out at step S426 to safely stop actions of the fuel cell 10. The purging process opens the first additional solenoid valve 455 on the first purge pipe 401 and the second additional solenoid valve 456 on the second purge pipe 403 after closing the first and the second solenoid valves 51 and 52 on the first branch pipe 41 and the third and the fourth solenoid valves 53 and 54 on the second branch pipe 42. This purging process allows the fuel cell 10 to be filled with the purge gas, instead of the gaseous fuel. This stops actions of the fuel cell 10 and substitutes hydrogen gas remaining in the fuel cell 10 by inert gas to keep the fuel cell 10 safely. The program then goes to STOP to exit from the routine.

When the answer is negative at step S422, that is, when the absolute value of the temperature difference TS is not greater than TC, the program proceeds to step S430. The process executed at steps S430 through S470 is substantially equivalent to that executed at steps S130 through S170 in the first embodiment. When the temperature difference TS is determined to be greater than the predetermined first value TA at step S430, the program goes to step S440 at which the flow of gaseous fuel in the fuel cell 10 is changed to the reverse direction as shown in FIG. 4(b). When the temperature difference TS is determined to be smaller than an additive inverse or negative of the predetermined first value TA at step S450, on the other hand, the program goes to step S460 at which the flow of gaseous fuel in the fuel cell 10 is changed to the normal direction as shown in FIG. 4(a). After the process at step S440 or S460, the further processing is delayed by a predetermined time at step S470. The program then goes to RETURN to exit from the routine.

When the temperature difference TS on the surface of the anode 32 continues increasing to exceed the predetermined third value TC even after the flow of gaseous fuel in the fuel cell 10 is changed to the reverse direction, the fuel cell generator system 400 of the fourth embodiment determines that the electrocatalyst on the anode 32 is significantly poisoned and that further generation of electricity from the fuel cell is difficult, and replaces the gaseous fuel in the fuel cell 10 with purge gas to safely stop actions of the fuel cell 10. This structure urgently inactivates the fuel cell 10 with significant electrocatalyst poisoning and effectively protects the fuel cell 10 as well as the load connecting with a peripheral element or the fuel cell 10.

Figure 13:
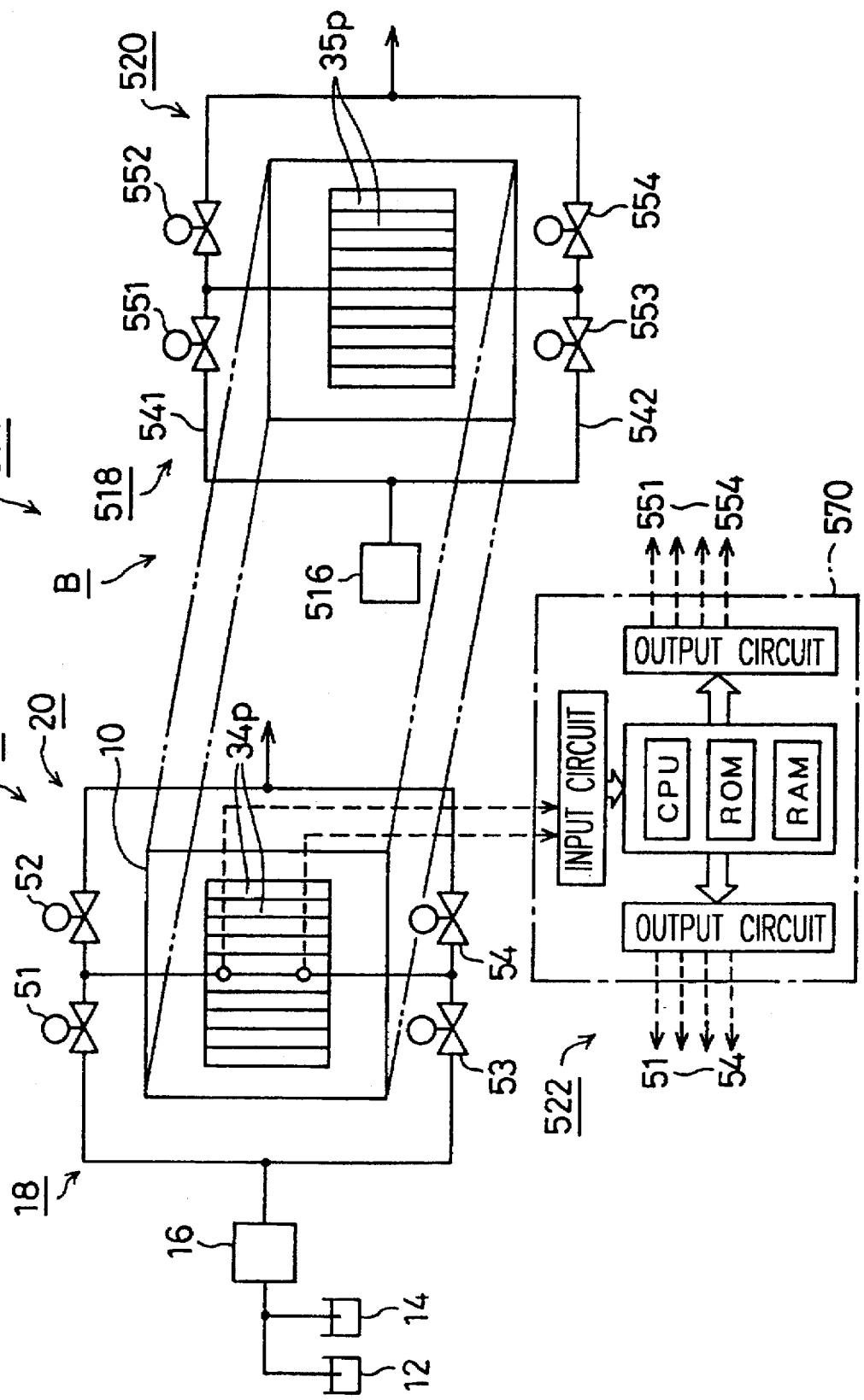
FIG. 13 is a block diagram schematically illustrating a structure of a fuel cell generator system 500 as a fifth embodiment according to the invention.

FIG. 13 is a block diagram schematically illustrating a structure of a fuel cell generator system 500 as a fifth embodiment according to the invention. The fuel cell generator system 500 includes a gaseous fuel system A having an identical structure with that of the first embodiment and an oxidizing gas system B having a structure similar to the gaseous fuel system A. The gaseous fuel system A of the fuel cell generator system 500 includes the fuel cell 10, the reformer 16, the gaseous fuel supply conduit 18, and the gas discharge conduit 20 like the first embodiment, whereas the oxidizing gas system B includes a reservoir 516 for storing an oxidizing gas (air in the embodiment), an oxidizing gas supply conduit 518 for feeding the oxidizing gas from the reservoir 516 to the second channels 35p (also shown in FIGS. 2 and 3) on the cathode's side in the fuel cell 10, and a residual gas discharge conduit 520 for discharging residual oxidizing gas fed into the second channels 35p.

The oxidizing gas supply conduit 518 and the residual gas discharge conduit 520 have two branch pipes 541 and 542, like the gaseous fuel supply conduit 18 and the gas discharge conduit 20. Fifth through eighth solenoid valves 551 through 554 are disposed on the branch pipes 541 and 542. An electronic control unit 570 of a control system 522 controls on and off these fifth through eighth solenoid valves 551 through 554 to switch the direction of flow of oxidizing gas running through the second channels 35p on the cathode's side in the fuel cell 10. Since the second channels 35p for oxidizing gas are arranged in parallel with the first channels 34p for gaseous fuel as shown by the two-dot chain line in FIG. 13 (also seen in FIGS. 2 and 3 of the first embodiment), the flow of oxidizing gas becomes parallel to the flow of gaseous fuel.

The electronic control unit 570 of the control system 522 controls on and off the fifth through the eighth solenoid valves 551 through 554 in the oxidizing gas system B, synchronously with the control of the first through the fourth solenoid valves 51 through 54 in the gaseous fuel system A. This results in changing the direction of flow of oxidizing gas synchronously with the switching of the flow direction of gaseous fuel to make the flow direction of oxidizing gas identical with that of gaseous fuel. At step S140 in the gaseous fuel control routine of the first embodiment shown in the flowchart of FIG. 5, the electronic control unit 570 closes the fifth and the eighth solenoid valves 551 and 554 as well as the first and the fourth solenoid valves 51 and 54 while opening the sixth and the seventh solenoid valves 552 and 553 as well as the second and the third solenoid valves 52 and 53. At step S160, the electronic control unit 570 opens the fifth and the eighth solenoid valves 551 and 554 as well as the first and the fourth solenoid valves 51 and 54 while closing the sixth and the seventh solenoid valves 552 and 553 as well as the second and the third solenoid valves 52 and 53.

When the electronic control unit 570 detects the existing poisoning of electrocatalyst on the anode 32, the fuel cell generator system 500 of the fifth embodiment changes the direction of flow of gaseous fuel through the first channels 34p on the anode's side, so as to allow a place with some electrocatalyst poisoning to be exposed to the gaseous fuel with a relatively low concentration of carbon monoxide. The structure of the fifth embodiment further changes the direction of flow of oxidizing gas synchronously with the change of the flow direction of gaseous fuel to make the flow direction of oxidizing gas identical with that of gaseous fuel, thereby exposing a place with an indication of electrocatalyst poisoning to the oxidizing gas with a relatively high concentration of oxygen. This structure further accelerates the reaction of anti-CO poisoning with the oxidizing gas containing a relatively high concentration of oxygen and thereby cancels the electrocatalyst poisoning more quickly and effectively. Namely the structure of the fifth embodiment effectively cancels the electrocatalyst poisoning in the fuel cell 10 without delay.

Figure 14:
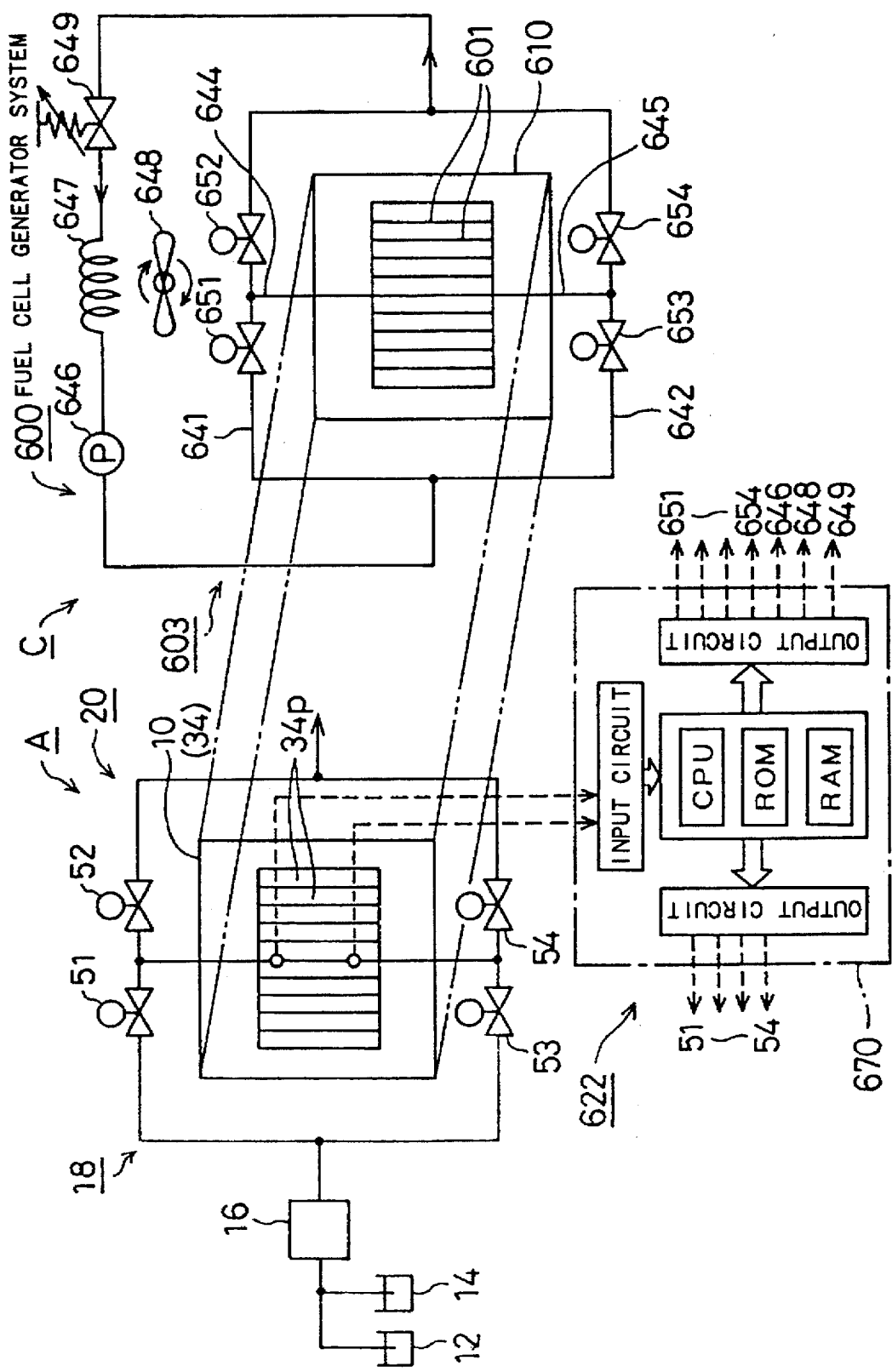
FIG. 14 is a block diagram schematically illustrating a structure of a fuel cell generator system 600 as a sixth embodiment according to the invention.

FIG. 14 is a block diagram schematically illustrating a structure of a fuel cell generator system 600 as a sixth embodiment according to the invention. The fuel cell generator system 600 includes a gaseous fuel system A having an identical structure with that of the first embodiment and a cooling water system C. The cooling water system C includes a plurality of cooling water channels 601 disposed in the fuel cell 10, and a circulation conduit 603 for allowing the cooling water to be circulated in the cooling water channels 601. The plurality of cooling water channels 601 are formed on each cooling plate 610 disposed for every predetermined number of cell elements included in the fuel cell 10, and arranged in parallel to the first channels 34p for gaseous fuel. The first separators 34 constituting the first channels 34p for gaseous fuel and the cooling plates 610 are laid one upon another to be positioned on the same perpendicular lines as shown by the two-dot chain line in FIG. 14.

The circulation conduit 603 is provided with a cooling water pump 646, a radiator 647, and a throttle valve 649. The circulated volume and the temperature of cooling water are controlled by regulating the discharge volume of the cooling water pump 646 and the rotating speed of a radiator fan 648 facing to the radiator 647. The circulation conduit 603 branches off to a first branch line 641 and a second branch line 642 in the vicinity of the cooling plate 610 and eventually connects with both ends of each cooling water channel 601 on the cooling plate 610 via a first connecting line 644 and a second connecting line 645 respectively extending from the first branch line 641 and the second branch line 642. Fifth through eighth solenoid valves 651 through 654 are disposed on the first and the second branch lines 641 and 642. An electronic control unit 670 of a control system 622 controls on and off these fifth through eighth solenoid valves 651 through 654 to switch the direction of flow of cooling water running through the cooling water channels 601. Since the cooling water channels 601 are arranged in parallel with the first channels 34p for gaseous fuel, the flow of cooling water becomes parallel to the flow of gaseous fuel.

The electronic control unit 670 of the control system 622 controls on and off the fifth through the eighth solenoid valves 651 through 654 in the cooling water system C, synchronously with the control of the first through the fourth solenoid valves 51 through 54 in the gaseous fuel system A.

This results in changing the direction of flow of cooling water synchronously with the switching of the flow direction of gaseous fuel to make the flow direction of cooling water reverse to that of gaseous fuel. At step S140 in the gaseous fuel control routine of the first embodiment shown in the flowchart of FIG. 5, the electronic control unit 670 opens the fifth and the eighth solenoid valves 651 and 654 as well as the second and the third solenoid valves 52 and 53 while closing the sixth and the seventh solenoid valves 652 and 653 as well as the first and the fourth solenoid valves 51 and 54. At step S160, the electronic control unit 670 closes the fifth and the eighth solenoid valves 651 and 654 as well as the second and the third solenoid valves 52 and 53 while opening the sixth and the seventh solenoid valves 652 and 653 as well as the first and the fourth solenoid valves 51 and 54.

When the electronic control unit 670 determines the existing poisoning of electrocatalyst on the anode 32, the fuel cell generator system 600 of the sixth embodiment changes the direction of flow of gaseous fuel through the first channels 34p on the anode's side, so as to allow a place with some electrocatalyst poisoning to be exposed to the gaseous fuel with a relatively low concentration of carbon monoxide. The structure of the sixth embodiment further changes the direction of flow of cooling water synchronously with the change of the flow direction of gaseous fuel to make the flow direction of cooling water reverse to that of gaseous fuel. This makes cooling water flow from a place with less electrocatalyst poisoning to that with greater electrocatalyst poisoning, thereby exposing the place with greater electrocatalyst poisoning to cooling water flown out of the cooling water channels 601. Cooling water has lower temperatures at positions closer to the inlet of the cooling water channels 601. The temperature of cooling water increases by means of heat generated through the electrode reactions in the fuel cell 10, and reaches the maximum at the outlet of the cooling water channels 601. This means that cooling water has higher temperatures at positions closer to the outlet of the cooling water channels 601. The place having greater electrocatalyst poisoning and exposed to cooling water flown out of the cooling water channels 601 accordingly has a relatively high temperature. The increase in temperature increases the concentration of carbon monoxide allowable for the fuel cell 10, thereby canceling the electrocatalyst poisoning more efficiently and quickly.

Figure 15:
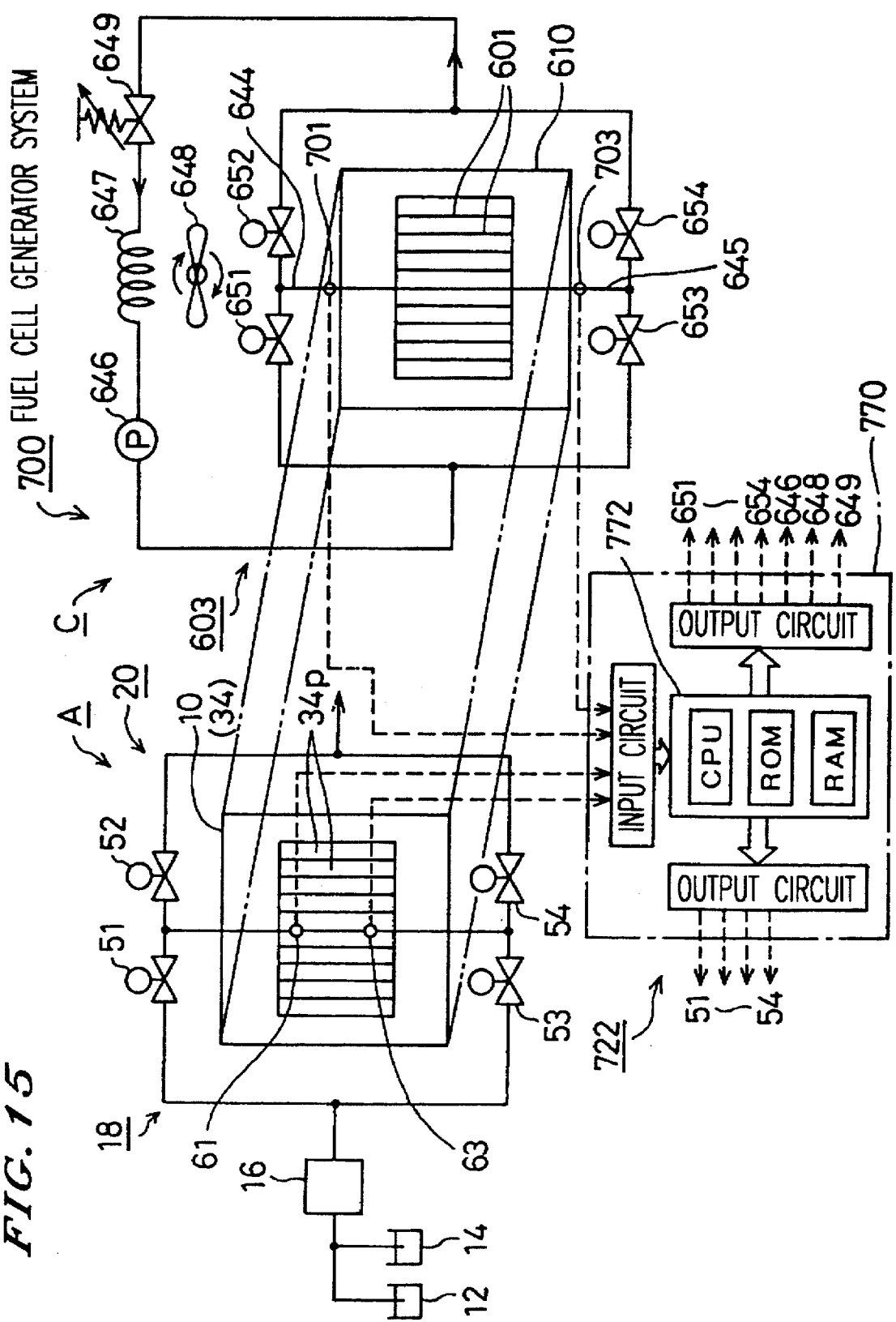
FIG. 15 is a block diagram schematically illustrating a structure of a fuel cell generator system 700 as a seventh embodiment according to the invention.

FIG. 15 is a block diagram schematically illustrating a structure of a fuel cell generator system 700 as a seventh embodiment according to the invention. The fuel cell generator system 700 has a similar structure to that of the sixth embodiment, except two additional temperature sensors 701 and 703. The third and the fourth temperature sensors 701 and 703 are disposed respectively at the first connecting line 644 and the second connecting line 645 connecting with the cooling plate 610 for measuring temperatures of cooling water at the inlet and the outlet of the cooling water channels 601. The additional temperature sensors 701 and 703 are electrically connected to an electronic control unit 770 of a control system 722. The electronic control unit 770 receives output signals from the third and the fourth temperature sensors 701 and 703 as well as those from the first and the second temperature sensors 61 and 63, and changes the flow direction of cooling water in the same manner as the sixth embodiment and controls the temperature and flow of cooling water, based on the received signals.

Figure 16:
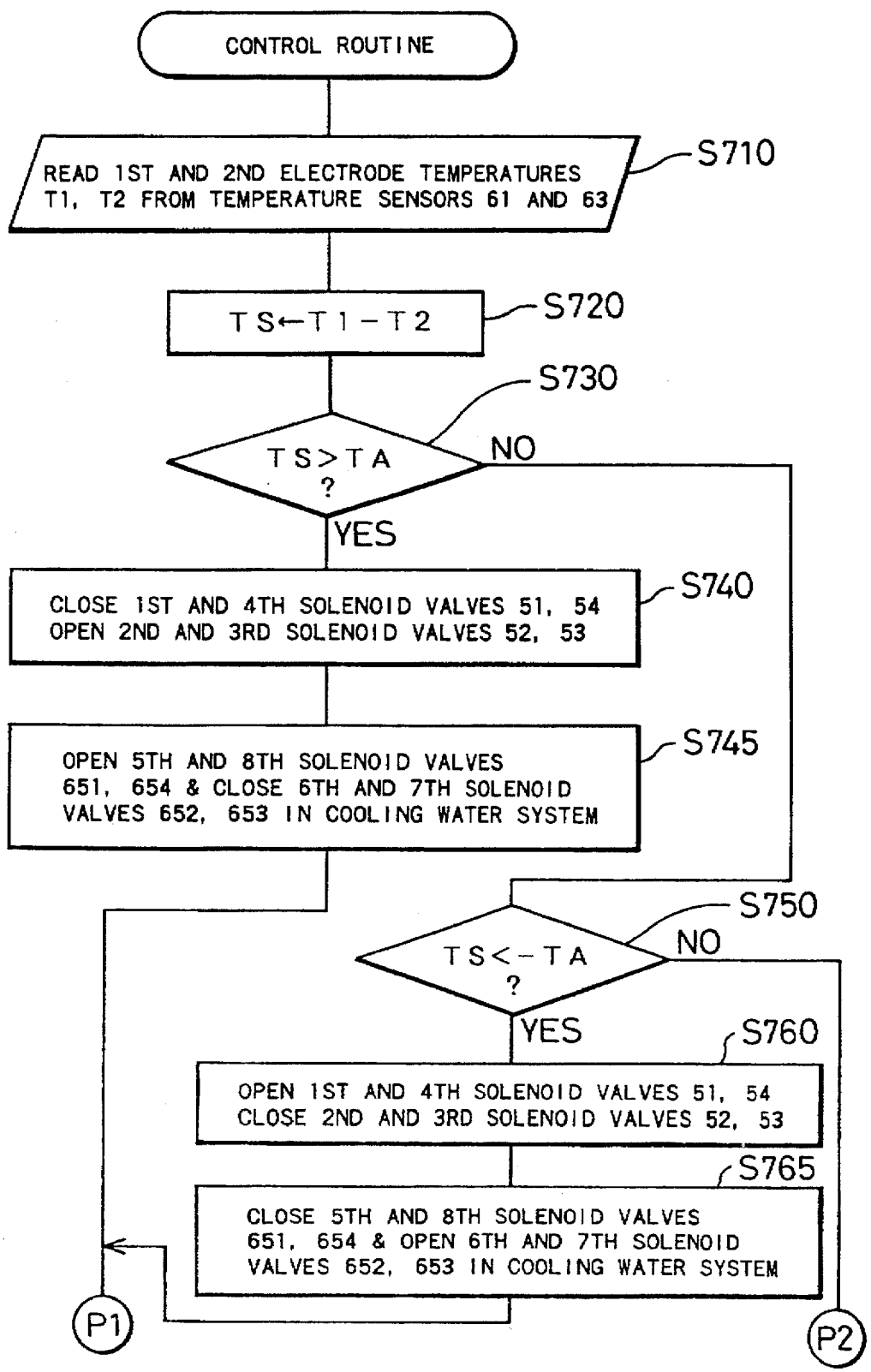
FIGS. 16 and 17 are flowcharts showing a control routine executed by the CPU 772 of the electronic control unit 770 in the seventh embodiment.
Figure 17:
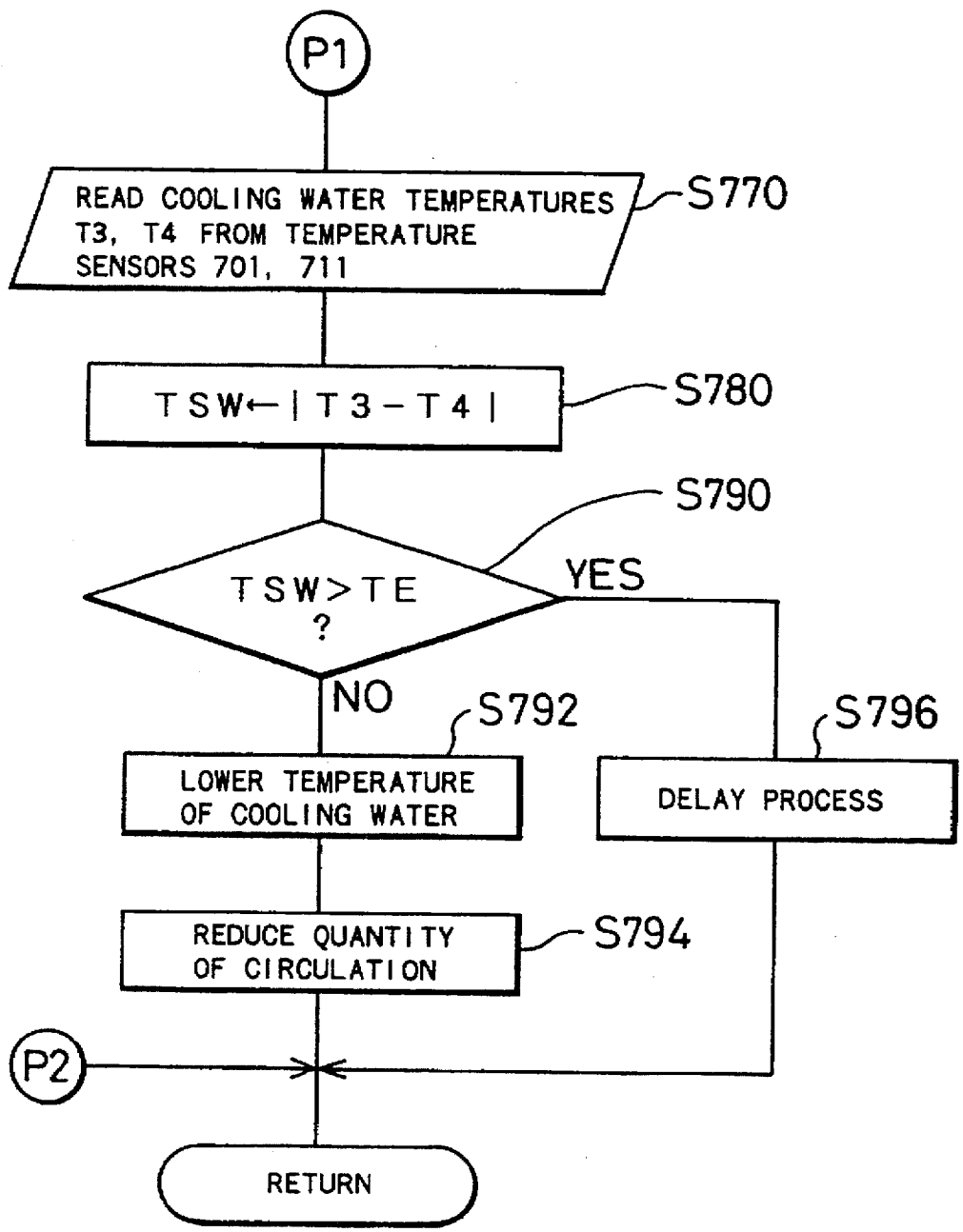

FIGS. 16 and 17 are flowcharts showing a control routine executed by the electronic control unit 770 in the seventh embodiment. The control routine is executed repeatedly by a CPU 772 of the electronic control unit 770 at predetermined time intervals. When the program enters the routine, the CPU 772 executes steps S710 through S760 in the flowchart of FIG. 16, which are equivalent to steps S110 through S160 of the gaseous fuel control routine in the first embodiment. After the process at step S740, the CPU 772 opens the fifth and the eighth solenoid valves 651 and 654 and closes the sixth and the seventh solenoid valves 652 and 653 at step S745. After the process at step S760, the CPU 772 closes the fifth and the eighth solenoid valves 651 and 654 and opens the sixth and the seventh solenoid valves 652 and 653 at step S765. The process executed at steps S710 through S765 corresponds to that of the sixth embodiment.

The program then proceeds to step S770 shown in the flowchart of FIG. 17, at which the CPU 772 reads a third temperature T3 of cooling water flown into the cooling water channels 601 and a fourth temperature T4 of cooling water flown out of the cooling water channels 601, from the third temperature sensor 701 and the fourth temperature sensor 703. At step S780, the CPU 772 subtracts the fourth temperature T4 of cooling water from the third temperature T3 of cooling water and determines the absolute value of the difference as a temperature difference TSW. The CPU 772 then compares the temperature difference TSW with a predetermined value TE (>0) at step S790.

When the answer is negative at step S790, that is, when the temperature difference TSW is not greater than the predetermined value TE, the program goes to step S792 at which the CPU 772 increases the rotating speed of the radiator fan 648 to increase dissipation of heat in the radiator 647, thereby lowering the temperature of cooling water flowing through the circulation conduit 603 by a predetermined value. The program then proceeds to step S794 at which the discharge volume of the cooling water pump 646 is reduced to decrease the quantity of circulation by a predetermined volume. The reduced temperature of cooling water at step S792 has a certain relationship to the reduced volume of circulation at step S794, so as to prevent the quantity of heat to be cooled from being varied. A simple decrease in temperature of the coolant may cause supercooling of the fuel cell 10, and it is thus required to regulate the flow of the coolant as well. The quantity of heat to be cooled is kept constant by reducing the flow of cooling water with a decrease in temperature of cooling water. This process increases the temperature difference between the inlet and the outlet of cooling water to the predetermined value TE while keeping the quantity of heat to be cooled constant.

When the answer is affirmative at step S790, that is, when the temperature difference TSW is greater than the predetermined value TE, on the contrary, the program goes to step S796 at which the further process is delayed by a predetermined time. After the process at step S794 or S796, the program goes to RETURN to exit from the routine.

When the electronic control unit 770 determines the existing poisoning of electrocatalyst on the anode 32, the fuel cell generator system 700 of the seventh embodiment changes the direction of flow of gaseous fuel so as to allow a place with some electrocatalyst poisoning to be exposed to the gaseous fuel with a relatively low concentration of carbon monoxide. The structure of the seventh embodiment further changes the direction of flow of cooling water synchronously with the change of the flow direction of gaseous fuel to make the flow direction of cooling water reverse to that of gaseous fuel, thereby exposing a place with greater electrocatalyst poisoning to cooling water of a relatively high temperature flown out of the cooling water channels 601.

The fuel cell generator system 700 increases the temperature difference between cooling water flown into and flown out of the cooling water channels 601 to the predetermined value TE while keeping the quantity of heat to be cooled constant. This allows a place with greater electrocatalyst poisoning to be exposed to cooling water of a relatively high temperature and a place with less electrocatalyst poisoning to be exposed to cooling water of a relatively low temperature. This effectively eliminates the temperature unbalance on the electrode surface and more quickly and efficiently returns the electrode with electrocatalyst poisoning to a normal state. The cooling plate 610 works to keep the quantity of heat to be cooled constant. This minimizes the variation in output with respect to the loading and allows the fuel cell 10 to stably work at a constant temperature.

When the existing electrocatalyst poisoning is detected, the structure of the sixth embodiment or the seventh embodiment changes the flow direction of gaseous fuel and switches the flow direction of cooling water to make cooling water flow from a place with less electrocatalyst poisoning to that with greater electrocatalyst poisoning. An alternative structure switches only the flow direction of gaseous fuel. This does not completely cancel the electrocatalyst poisoning, but prevents further poisoning by increasing the concentration of carbon monoxide allowable for the fuel cell 10.

The sixth embodiment and the seventh embodiment use water as a coolant of the fuel cell 10. Other possible examples for the coolant include organic liquids, such as ethylene glycol and silicone oil, and gases, such as the air and an inert gas.

An eighth embodiment of the invention is described briefly. While the embodiments described above change the flow direction of gaseous fuel based on the detection of existing electrocatalyst poisoning, the structure of the eighth embodiment switches the power source for supplying electricity to a load from the polymer electrolyte fuel cell 10 to a secondary cell (not shown) connected with the fuel cell 10 electrically in parallel, synchronously with the switch of the flow of gaseous fuel.

The switch of the power source for supplying electricity to the load is carried out in the following manner. In the structure where the secondary cell and the fuel cell 10 are connected in parallel with each other to allow a supply of electricity to the load from both the secondary cell and the fuel cell 10, the fuel cell 10 is disconnected from the load, which cuts the load current through the fuel cell 10. The flow direction of gaseous fuel fed to the fuel cell 10 is then changed through on-off control of the first through the fourth solenoid valves 51 through 54. There is a certain time lag between the on-off operations of the solenoid valves 51 through 54 and actual reversion of the flow direction to give a stable flow of gaseous fuel. The time lag depends upon the length of piping, the diameter of pipes, positions of the on-off valves, and the flow rate and pressure of gas in each fuel cell 10. It is accordingly desirable to measure and determine an optimum time, after which the flow of gaseous fuel becomes stable, for each fuel cell 10. After the optimum time has elapsed, the fuel cell 10 is re-connected to the load, which allow a supply of electricity from both the secondary cell and the fuel cell 10. The secondary cell is then disconnected from the load, so that electricity is supplied only from the fuel cell 10 to the load.

This structure reduces the load current of the fuel cell 10 and controls a temporary drop of output voltage accompanied with the switching of the flow direction of gaseous fuel.

A ninth embodiment of the invention is described briefly. The ninth embodiment is a modification of the third embodiment described previously. While the third embodiment increases the flow of air into the partial oxidizing unit 303 of the reformer 16 under the condition of little electrocatalyst poisoning (step S324 in the flowchart of FIG. 10), the structure of the ninth embodiment increases the gas pressure in the gaseous fuel system under the condition of little electrocatalyst poisoning. The increase in gas pressure is implemented by controlling a pressure regulating valve disposed generally after the outlet of gaseous fuel in the fuel cell 10.

This structure temporarily raises the gas pressure over the ideal level to enhance the anti-CO poisoning ability of electrocatalyst with a temporary drop in efficiency of the fuel cell 10. This effectively cancels a small degree of electrocatalyst poisoning and inhibits further poisoning, like the third embodiment.

There may be many other modifications, alterations, and changes without departing from the scope or spirit of essential characteristics of the invention. It is thus clearly understood that the above embodiments are only illustrative and not restrictive in any sense. Some examples of modification are given below.

An alloy electrocatalyst may be used in place of platinum, which is used as the electrocatalyst of the anode 32 in the above embodiments. The alloy electrocatalyst includes a first component of platinum and one or a plurality of second components selected among the group including ruthenium, nickel, cobalt, vanadium, palladium, and indium. The alloy electrocatalyst exerts the same effects as platinum in the above embodiments.

In the above embodiments, the structure of inputting a difference between temperatures measured by the first and the second temperature sensors 61 and 63 disposed on the electrode surface works as the reactivity difference detecting means. An alternative structure has three or more temperature sensors to detect temperatures on both ends of a selected first channel 34p for gaseous fuel and at another or other specific site(s). Electrocatalyst poisoning tends to occur at a specific site (for example, the site where gas stagnates) according to the shape of the first channels 34p for gaseous fuel. This alternative structure measures the temperature of such a specific site as well as the ends of the first channel 34p in the fuel cell 10, thereby more accurately detecting the poisoning of electrocatalyst by carbon monoxide.

In the above embodiments, gaseous fuel, oxidizing gas, or cooling water is distributed to the respective cell elements included in a fuel cell via a manifold or distributor. On the assumption that the cell elements in a fuel cell have substantially identical properties and the manifold uniformly distributes the gas or cooling water, poisoning of platinum electrocatalyst by carbon monoxide simultaneously occurs and is canceled in all the cell elements of the fuel cell. In the actual system, however, a heterogeneous flow of gas in the manifold causes electrocatalyst poisoning to occur at a specific cell element in the fuel cell. It is accordingly desirable to set the two temperature sensors 61 and 63 at such a cell element having a higher probability of electrocatalyst poisoning. This minimizes the number (two) of thermocouples required in a fuel cell stack including a large number of fuel cell elements, thus easily controlling the fuel cell generator system and reducing the cost for manufacturing the fuel cell generator system.

The structure of inputting a difference between temperatures measured by the first and the second temperature sensors 61 and 63 disposed on the electrode surface is applied for the reactivity difference detecting means in the above embodiments. Some operating conditions of the fuel cell 10 lead to the local wetting or drying on the electrolyte membrane/electrode structure of each cell element, thereby interfering with the electrochemical reactions at the gas outlet on the anode's side or the cathode's side and lowering the temperature of the site. This may result in an inaccurate detection of temperature. The fuel cell generally has a structure of continuously monitoring the impedance (cell resistance) of the fuel cell and regulating the amount of water vapor or moisture in the gaseous fuel or oxidizing gas based on the monitoring to keep the electrolyte membrane/electrode structure in the optimum wetting condition. Any structure of the above embodiments is preferably applied to such a fuel cell 10 having a function of controlling the impedance.

When the structure of the above embodiments is applied to a fuel cell 10 having no function of controlling the impedance, an impedance meter for measurement of the impedance is set in the fuel cell generator system. According to a preferable structure, it is determined whether the difference in temperature between the two temperature sensors 61 and 63 disposed on the electrode surface is attributable to the local wetting or drying on the electrolyte membrane/electrode structure or to poisoning of platinum electrocatalyst by carbon monoxide included in the gaseous fuel.

The scope and spirit of the present invention are limited only by the terms of the appended claims.

What is claimed is:

1. A fuel cell generator for generating an electromotive force through an electrochemical reaction of a reactive gas, said fuel cell generator comprising:

an electrode having a surface with an electrocatalyst applied thereon, said reactive gas being fed to a surface of said electrode to cause said electrochemical reaction;

a flow path having an inlet and an outlet for supplying said reactive gas to said surface of said electrode;

reactivity difference detecting means for detecting a difference in reactivity of said electrocatalyst between said inlet and said outlet of said flow path; and poisoning cancellation means for varying said electrochemical reaction between said inlet and said outlet of said flow path based on the difference detected by said reactivity difference detecting means to cancel poisoning of said electrocatalyst.

2. A fuel cell generator in accordance with claim 1, further comprising:

gas utilization calculating means for calculating a degree of utilization of said reactive gas on said electrode; and prohibition means for prohibiting said cancellation of the poisoning of said electrocatalyst when the degree of utilization of said reactive gas represents insufficiency of said reactive gas.

3. A fuel cell generator in accordance with claim 2, wherein said gas utilization calculating means comprises:

required flow calculation means for calculating a required flow of said reactive gas to said electrode;

actual supply calculation means for calculating an actual supply of said reactive gas to said electrode; and difference calculation means for calculating a difference between said required flow and said actual supply.

4. A fuel cell generator in accordance with claim 1, wherein said reactivity difference detecting means comprises:

temperature difference detecting means for detecting a difference in temperature between said inlet and said outlet of said flow path.

5. A fuel cell generator in accordance with claim 1, wherein said reactivity difference detecting means further comprises:

electrical output difference detecting means for detecting a difference in electrical output of said electrode between said inlet and said outlet of said flow path.

6. A fuel cell generator in accordance with claim 1, wherein said poisoning cancellation means comprises:

gas flow control means for controlling a flow direction of said reactive gas to reduce said poisoning.

7. A fuel cell generator in accordance with claim 6, wherein said electrode is a first electrode and wherein said poisoning cancellation means further comprises:

a second electrode having a surface with an electrocatalyst applied thereon, an oxidizing gas being fed to a surface of said second electrode;

oxidizing gas flow control means for controlling a flow direction of said oxidizing gas, to make the flow direction of said oxidizing gas identical with the flow direction of said reactive gas.

8. A fuel cell generator in accordance with claim 6, further comprising:

a coolant conduit running substantially parallel to the surface of said electrode for passing a coolant parallel to the flow direction of said reactive gas; and wherein said poisoning cancellation means further comprises:

coolant flow control means for controlling a flow direction of the coolant through the coolant conduit to reduce said poisoning.

9. A fuel cell generator in accordance with claim 8, further comprising:

temperature control means for varying temperature of the coolant fed to said coolant conduit; and flow control means for varying a flow of the coolant fed to said coolant conduit, wherein said poisoning cancellation means further comprises:

cooling heat quantity control means for activating said temperature control means and said flow control means to lower the temperature and the flow of said coolant, so as to maintain a constant quantity of heat absorbable by said coolant.

10. A fuel cell generator in accordance with claim 1, further comprising:

reforming means for reforming a fuel to generate said reactive gas; and wherein said poisoning cancellation means comprises:
    gas flow reversing means for reversing the flow direction of said reactive gas along the surface of said electrode;
    reforming suppression means for lowering the reforming efficiency of said reforming means to forcibly lower the concentration of the carbon monoxide included in said reactive gas; and
    selective activating means for selectively activating one of said gas flow reversing means and said reforming suppression means according to the difference detected by said reactivity difference detecting means.

11. A fuel cell generator in accordance with claim 1, wherein said poisoning cancellation means further comprises:

gas flow reversing means for reversing the flow direction of said reactive gas along the surface of said electrode;

supply pressure increasing means for temporarily increasing a supply pressure of said reactive gas to said electrode; and selective activating means for selectively activating one of said gas flow reversing means and said supply pressure increasing means according to a degree of poisoning of the electrocatalyst based upon the detection made by the reactivity difference detecting means.

12. A fuel cell generator in accordance with claim 1, wherein said poisoning cancellation means further comprises:

gas flow reversing means for reversing the flow direction of said reactive gas along the surface of said electrode;

stop means for substituting said reactive gas with a purge gas flowing along the surface of said electrode to stop generation of the electromotive force; and selectively activating means for selectively activating one of said gas flow reversing means and said stop means according to the difference detected by said reactivity difference detecting means.

13. A fuel cell generating method for generating an electromotive force through an electrochemical reaction of a reactive gas, said method comprising the steps of:

(a) providing an electrode having a surface with an electrocatalyst applied thereon, said reactive gas being fed to a surface of said electrode to cause said electrochemical reaction;

(b) providing a flow path having an inlet and an outlet for supplying said reactive gas to said surface of said first electrode;

(c) detecting a difference in reactivity of said electrocatalyst between said inlet and said outlet of said flow path;

(d) estimating a degree of poisoning of said electrocatalyst based on the difference detected in said step (c); and (e) canceling the poisoning according to the degree of poisoning of said electrocatalyst determined in said step (d).

14. A method in accordance with claim 13, further comprising the step of:

(f) calculating a degree of utilization of said reactive gas on said electrode; and wherein said step (d) comprises the step of:

(d-1) prohibiting said estimation of the degree of poisoning when the degree of utilization of said reactive gas represents insufficiency of said reactive gas.

15. A method in accordance with claim 13, wherein said step (c) comprises the step of:

(c-1) detecting a difference in temperature between said inlet and said outlet of said flow path.

16. A method in accordance with claim 13, wherein said step (e) comprises the step of:

(e-1) controlling a flow direction of said reactive gas to reduce said poisoning.

17. A method in accordance with claim 16, further comprising the step of:

(g) providing a second electrode having a surface with an electrocatalyst applied thereon, an oxidizing gas being fed to a surface of said second electrode; and wherein said step (e) further comprises the step of:

(e-2) controlling a flow direction of said oxidizing gas, to make the flow direction of said oxidizing gas identical with the flow direction of said reactive gas.

18. A method in accordance with claim 16, further comprising the step of:

(h) passing a coolant parallel to the flow direction of said reactive gas along the surface of said first electrode; and wherein said step (e) further comprises the step of:

(e-3) controlling a flow direction of the coolant conduit to reduce said poisoning.

19. A method in accordance with claim 13, wherein said step (e) further comprises the steps of:

(e-4) forcibly lowering a concentration of carbon monoxide included in said reactive gas;

(e-5) reversing the flow direction of said reactive gas along the surface of said first electrode; and (e-6) selectively executing one of said step (e-4) and said step (e-5) according to the degree of poisoning of electrocatalyst estimated in said step (d).

20. A fuel cell generator for generating an electromotive force through an electrochemical reaction of a reactive gas, said fuel cell generator comprising:

an electrode having a surface with an electrocatalyst applied thereon, said reactive gas being fed to a surface of said electrode to cause said electrochemical reaction;

a flow path having an inlet and an outlet for supplying said reactive gas to said surface of said electrode;

reactivity difference detecting means for detecting a difference in reactivity of said electrocatalyst between said inlet and said outlet of said flow path;

estimation means for estimating a degree of poisoning of said electrocatalyst based on the difference detected by said reactivity difference detecting means;

poisoning cancellation means for cancelling the poisoning according to the degree of poisoning of said electrocatalyst determined by said estimation means; and gas utilization estimation calculating means for calculating a degree of utilization of said reactive gas on said electrode, wherein said estimation means comprises prohibition means for prohibiting the estimation of the degree of poisoning when the degree of utilization of said reactive gas represents insufficiency of said reactive gas.

21. A fuel cell generator for generating an electromotive force through an electrochemical reaction of a reactive gas, said fuel cell generator comprising:

an electrode having a surface with an electrocatalyst applied thereon, said reactive gas being fed to a surface of said electrode to cause said electrochemical reaction;

a flow path having an inlet and an outlet for supplying said reactive gas to said surface of said electrode;

reactivity difference detecting means for detecting a difference in reactivity of said electrocatalyst between said inlet and said outlet of said flow path;

estimation means for estimating a degree of poisoning of said electrocatalyst based on the difference detected by said reactivity difference detecting means; and poisoning cancellation means for cancelling the poisoning according to the degree of poisoning of said electrocatalyst determined by said estimation means, wherein said reactivity difference detecting means comprises temperature difference detecting means for detecting a difference in temperature between said inlet and said outlet of said flow path.

22. A fuel cell generator for generating an electromotive force through an electrochemical reaction of a reactive gas, said fuel cell generator comprising:

an electrode having a surface with an electrocatalyst applied thereon, said reactive gas being fed to a surface of said electrode to cause said electrochemical reaction;

a flow path having an inlet and an outlet for supplying said reactive gas to said surface of said electrode;

reactivity difference detecting means for detecting a difference in reactivity of said electrocatalyst between said inlet and said outlet of said flow path;

estimation means for estimating a degree of poisoning of said electrocatalyst based on the difference detected by said reactivity difference detecting means; and poisoning cancellation means for cancelling the poisoning according to the degree of poisoning of said electrocatalyst determined by said estimation means, wherein said reactivity difference detecting means comprises electrical output difference detecting means for detecting a difference in electrical output of said electrode between said inlet and said outlet of said flow path.

23. A fuel cell generator for generating an electromotive force through an electrochemical reaction of a reactive gas, said fuel cell generator comprising:

an electrode having a surface with an electrocatalyst applied thereon, said reactive gas being fed to a surface of said electrode to cause said electrochemical reaction;

a flow path having an inlet and an outlet for supplying said reactive gas to said surface of said electrode;

reactivity difference detecting means for detecting a difference in reactivity of said electrocatalyst between said inlet and said outlet of said flow path;

estimation means for estimating a degree of poisoning of said electrocatalyst based on the difference detected by said reactivity difference detecting means;

poisoning cancellation means for cancelling the poisoning according to the degree of poisoning of said electrocatalyst determined by said estimation means; and reformer means for reforming a fuel to generate said reactive gas, wherein said poisoning cancellation means comprises reforming suppression means for forcibly lowering a concentration of carbon monoxide included in said reactive gas, gas flow reversing means for reversing the flow direction of said reactive gas along the surface of said electrode, and selective activating means for selectively activating one of said gas flow reversing means and said reforming suppression means according to the degree of poisoning of said electrocatalyst estimated by said estimation means.

24. A fuel cell generator for generating an electromotive force through an electrochemical reaction of a reactive gas, said fuel cell generator comprising:

an electrode having a surface with an electrocatalyst applied thereon, said reactive gas being fed to a surface of said electrode to cause said electrochemical reaction;

a flow path having an inlet and an outlet for supplying said reactive gas to said surface of said electrode;

reactivity difference detecting means for detecting a difference in reactivity of said electrocatalyst between said inlet and said outlet of said flow path;

estimation means for estimating a degree of poisoning of said electrocatalyst based on the difference detected by said reactivity difference detecting means; and poisoning cancellation means for cancelling the poisoning according to the degree of poisoning of said electrocatalyst determined by said estimation means, wherein said poisoning cancellation means comprises supply pressure increasing means for temporarily increasing a supply pressure of said reactive gas to said electrode, gas flow reversing means for reversing the flow direction of said reactive gas along the surface of said electrode, and selective activating means for selectively activating one of said gas flow reversing means and said supply pressure increasing means according to the degree of poisoning of the electrocatalyst estimated by said estimation means.

25. A fuel cell generator for generating an electromotive force through an electrochemical reaction of a reactive gas, said fuel cell generator comprising:

an electrode having a surface with an electrocatalyst applied thereon, said reactive gas being fed to a surface of said electrode to cause said electrochemical reaction;

a flow path having an inlet and an outlet for supplying said reactive gas to said surface of said electrode;

reactivity difference detecting means for detecting a difference in reactivity of said electrocatalyst between said inlet and said outlet of said flow path;

estimation means for estimating a degree of poisoning of said electrocatalyst based on the difference detected by said reactivity difference detecting means; and poisoning cancellation means for cancelling the poisoning according to the degree of poisoning of said electrocatalyst determined by said estimation means, wherein said poisoning cancellation means comprises stop means for substituting said reactive gas with a purge gas flowing along the surface of said first electrode to stop generation of the electromotive force, gas flow reversing means for reversing the flow direction of said reactive gas along the surface of said electrode, and selective activating means for selectively activating one of said gas flow reversing means and said stop means according to the degree of poisoning of the electrocatalyst estimated by said estimation means.

* * * * *